(12) United States Patent
Chon et al.

(10) Patent No.: US 9,432,685 B2
(45) Date of Patent: Aug. 30, 2016

(54) SCALABLE IMPLEMENTATION FOR PARALLEL MOTION ESTIMATION REGIONS

(71) Applicant: QUALCOMM Incorporated, San Diego, CA (US)

(72) Inventors: Jaehong Chon, San Diego, CA (US); In Suk Chong, San Diego, CA (US); Hariharan Ganesh Lalgudi, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/099,800

(22) Filed: Dec. 6, 2013

(65) Prior Publication Data

US 2015/0163506 A1    Jun. 11, 2015

(51) Int. Cl.
| | |
|---|---|
| *H04B 1/66* | (2006.01) |
| *H04N 19/513* | (2014.01) |
| *H04N 19/187* | (2014.01) |
| *H04N 19/52* | (2014.01) |
| *H04N 19/436* | (2014.01) |

(52) U.S. Cl.
CPC .......... *H04N 19/513* (2014.11); *H04N 19/187* (2014.11); *H04N 19/436* (2014.11); *H04N 19/52* (2014.11)

(58) Field of Classification Search
CPC ... H04N 19/513; H04N 19/52; H04N 19/187
USPC .................................................... 375/240.16
See application file for complete search history.

(56) References Cited

U.S. PATENT DOCUMENTS

| | | |
|---|---|---|
| 2011/0194608 A1 | 8/2011 | Rusert et al. |
| 2012/0008688 A1 | 1/2012 | Tsai et al. |

(Continued)

FOREIGN PATENT DOCUMENTS

| | | | |
|---|---|---|---|
| CN | WO 2012174990 A1 * | 12/2012 | ............. H04N 19/56 |
| WO | WO-2012171477 A1 | 12/2012 | |

(Continued)

OTHER PUBLICATIONS

International Search Report and Written Opinion—PCT/US2014/065757—ISA/EPO—Apr. 1, 2015.

(Continued)

*Primary Examiner* — Jamie Atala
*Assistant Examiner* — Masum Billah
(74) *Attorney, Agent, or Firm* — Knobbe, Martens, Olson & Bear, LLP

(57) ABSTRACT

A video coding device configured according to some aspects of this disclosure includes a memory configured to store a plurality of motion vector candidates. Each motion vector candidate can corresponding to at least one of a plurality of prediction units (PUs) partitioned in a parallel motion estimation region (MER). The video coding device also includes a processor in communication with the memory. The processor is configured to select a subset of the plurality of motion vector candidates to include in a merge candidate list. The selection can be based on a priority level of each motion vector candidate. The processor can be further configured to generate the merge candidate list to include the selected motion vector candidates.

24 Claims, 17 Drawing Sheets

(56) References Cited

U.S. PATENT DOCUMENTS

| | | | |
|---|---|---|---|
| 2012/0257678 A1* | 10/2012 | Zhou | H04N 19/436 375/240.16 |
| 2012/0320984 A1 | 12/2012 | Zhou | |
| 2013/0107942 A1* | 5/2013 | Chen | H04N 19/70 375/240.03 |
| 2013/0336399 A1* | 12/2013 | Yu | H04N 19/70 375/240.14 |

FOREIGN PATENT DOCUMENTS

| WO | WO-2012174990 A1 | 12/2012 |
|---|---|---|
| WO | WO-2013056656 A1 | 4/2013 |

OTHER PUBLICATIONS

Kim I.-K., et al., "High Efficiency Video Coding (HEVC) Test Model 12 (HM 12) Encoder Description", 14. JCT-VC Meeting; Jul. 25, 2013-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N1002, Oct. 21, 2013, XP030114946, 36 Pages.

\* cited by examiner

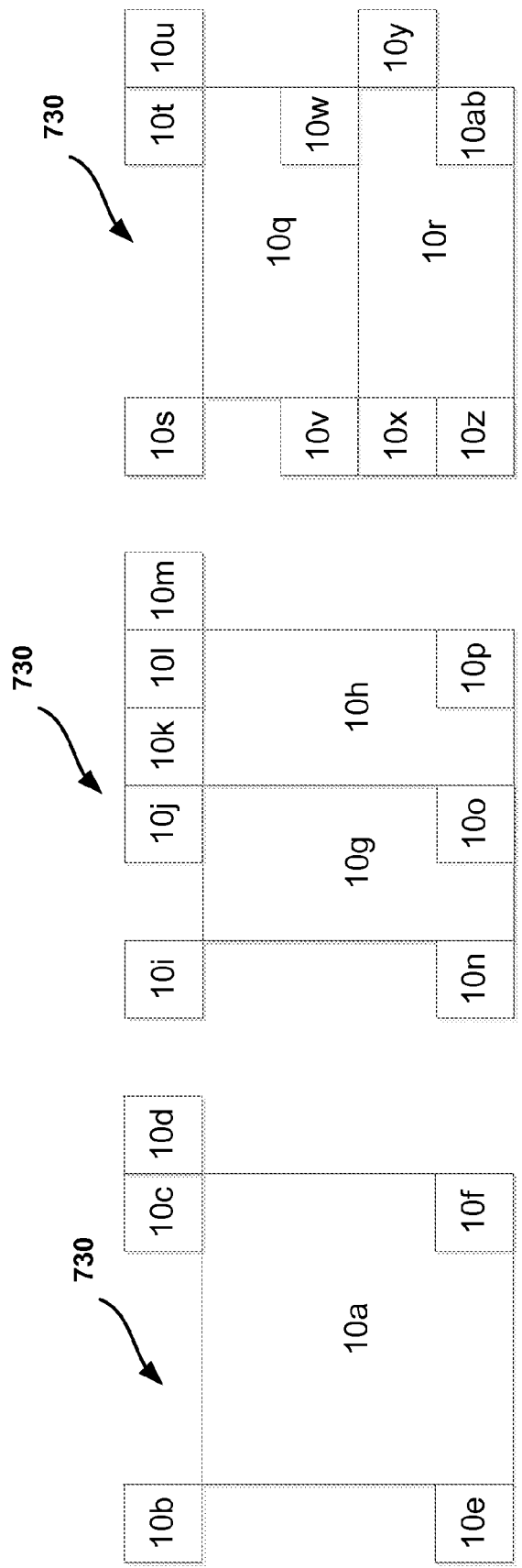

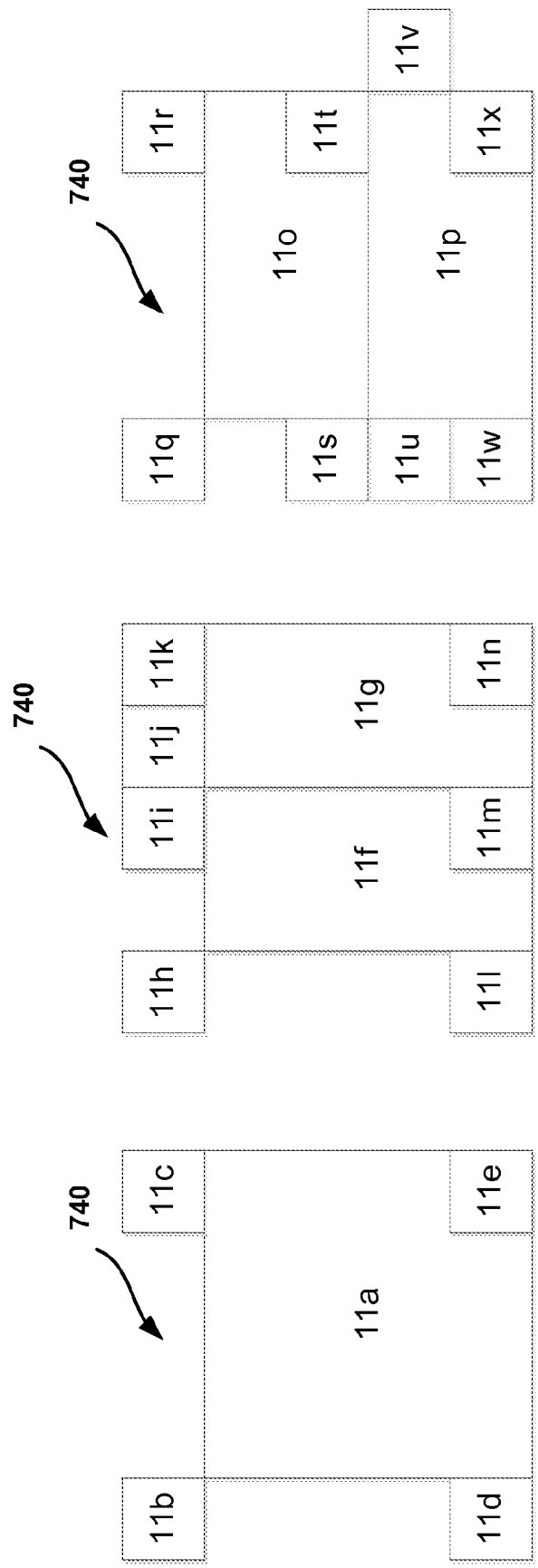

SCALABLE IMPLEMENTATION FOR PARALLEL MOTION ESTIMATION REGIONS

FIELD

This disclosure generally relates to techniques for encoding and decoding video information, and in particular to scalable video coding.

BACKGROUND

Digital video capabilities may be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

A video coding device configured according to some aspects of this disclosure includes a memory configured to store a plurality of motion vector candidates. Each motion vector candidate can correspond to at least one of a plurality of prediction units (PUs) partitioned in a parallel motion estimation region (MER). The video coding device also includes a processor in communication with the memory. The processor is configured to select a subset of the plurality of motion vector candidates to include in a merge candidate list. The selection can be based on a priority level of each motion vector candidate. The processor can be further configured to generate the merge candidate list to include the selected subset of the plurality of motion vector candidates.

In another embodiment, a method of decoding video data includes receiving syntax elements extracted from an encoded video bit stream, selecting motion vector candidates to include in a merge candidate list, and generating the merge candidate list. The syntax elements can include information associated with a plurality of motion vector candidates. Each motion vector candidate can correspond to at least one of a plurality of prediction units (PUs) partitioned in a parallel motion estimation region (MER). Selecting the merge candidate list includes selecting a subset of the plurality of motion vector candidates to include in a merge candidate list. Selection can be based on a priority level of each of the plurality of motion vector candidates. The merge candidate list is generated to include the selected subset of the plurality of motion vector candidates.

In another embodiment, a method of encoding video data includes: determining information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data; selecting a subset of the plurality of motion vector candidates to include in a merge candidate list, wherein selection is based on a priority level of each of the plurality of motion vector candidates; and generating the merge candidate list to include the selected subset of the plurality of motion vector candidates.

In another embodiment, a video coding apparatus includes: means for determining information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data; means for selecting a subset of the plurality of motion vector candidates to include in a merge candidate list, wherein selection is based on a priority level of each of the plurality of motion vector candidates; and means for generating the merge candidate list to include the selected subset of the plurality of motion vector candidates.

In another embodiment, a non-transitory computer readable medium includes code stored thereon that when executed causes an apparatus to: receive information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data; select a subset of the plurality of motion vector candidates to include in a merge candidate list, wherein selection is based on a priority level of each of the plurality of motion vector candidates; and generate the merge candidate list to include the selected subset of the plurality of motion vector candidates.

The details of one or more examples are set forth in the accompanying drawings and the description below. Other features, objects, and advantages will be apparent from the description and drawings, and from the claims.

BRIEF DESCRIPTION OF THE DRAWINGS

FIGS. 10A-10C illustrate another example CU decomposition showing MV candidate positions for some PUs.

FIGS. 11A-11C illustrate another example CU decomposition showing MV candidate positions for some PUs.

DETAILED DESCRIPTION

Figure 1:
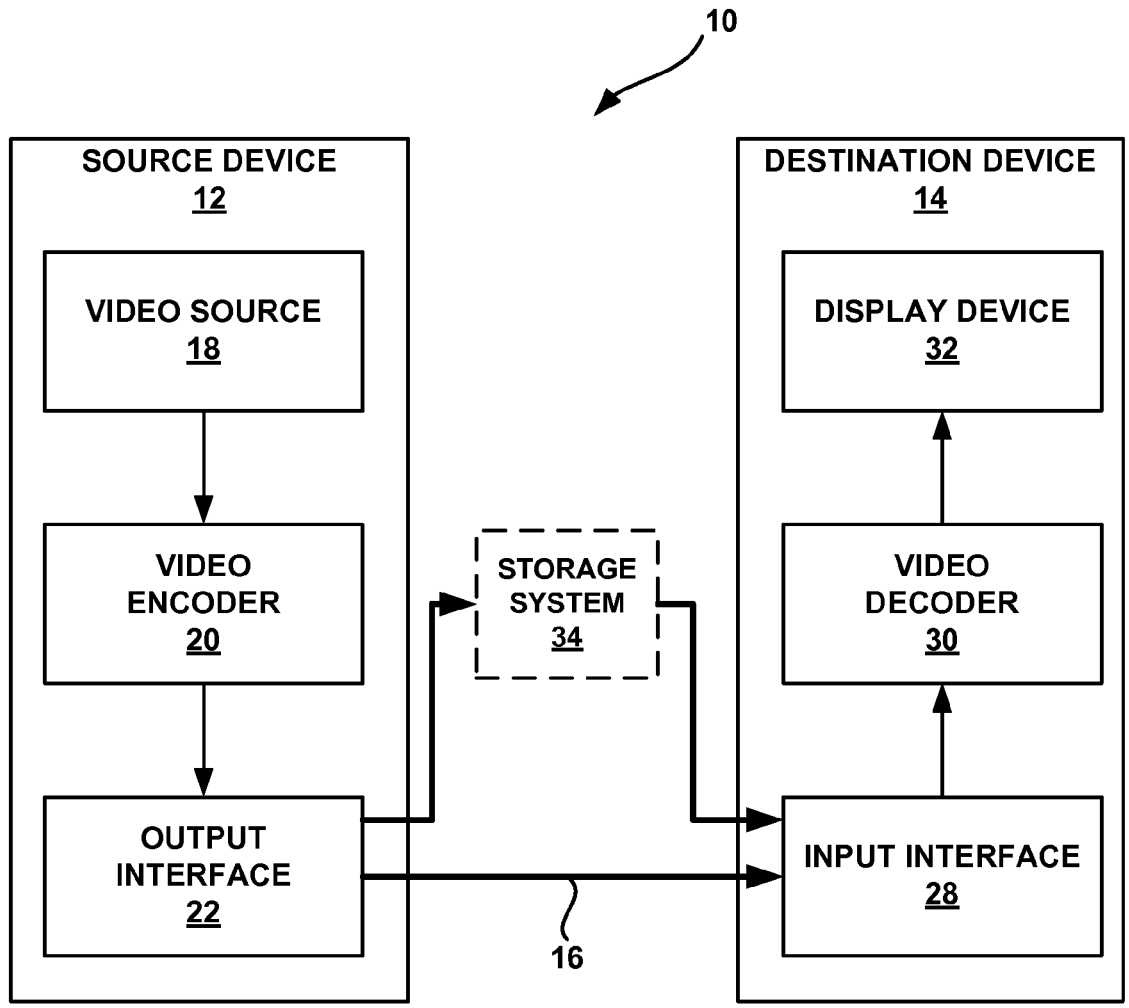
FIG. 1 is a block diagram that illustrates an example video coding system.

The current HEVC merge mode design is highly sequential and introduces dependency among neighboring prediction units (PUs) in different coding units (CUs). The sequential nature of HEVC merge mode design can create difficulty for motion estimation (ME) on the encoder side for pipelined architecture, in which motion vectors might be estimated in parallel for multiple PUs. Parallel motion estimation can be needed due to considerations of throughput or implementation cost. However, parallel motion estimation can also lead to significant coding efficiency loss. The loss can be caused because for a given PU inside a parallel MER, e.g. a 8×8 PU inside a 32×32 parallel MER, not all of its neighboring motion data may be available for inclusion in a merge candidate list as a result of parallel processing.

An area in which motion estimation for different PUs is done in parallel is also referred as motion estimation region (MER). HEVC allows a high-level syntax element to signal a parallel merge mode. In the parallel merge mode, an LCU may be divided into a number of MERs. In this case, only those external neighboring motion vectors (MV) which belong to different MERs are allowed to be included in a merge candidate list for a PU in the MER. Improved selection of MV candidates for inclusion in the merge candidate list, as described herein, can improve coding efficiency and reduce computational complexity.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 6" is downloadable from http://phenix.int-evry.fr/jct/doc_end_user/documents/8_San%20Jose/wg11/JCTVC-H1003-v6.zip. The full citation for HEVC Working Draft 6 is document JCTVC-H1003, Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7th Meeting: Geneva, Switzerland, Nov. 21, 2011 to Nov. 30, 2011. Another, later draft of the HEVC standard is available from http://wg11.sc29.org/jct/doc_end_user/current_document.php?id=5885/JCTVC-I1003-v2, as of Jun. 7, 2012. Another, later draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. Another, later draft of the HEVC standard, referred to as HEVC WD8 (working draft 8) is available from http://phenix.int-evry.fr/jct/doc_end_user/documents/10_Stockholm/wg11/JCTVC-J1003-v8.zip. Each of these references is incorporated by reference in its entirety.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different video filters and video coders that may be used with, e.g., different wireless technologies, system configurations, networks, and transmission protocols, some of which are illustrated by way of example in the figures and in the following description of the particular aspects. The detailed description and drawings are merely illustrative of the disclosure rather than limiting, the scope of the disclosure being defined by the appended claims and equivalents thereof.

Video Coding System

FIG. 1 is a block diagram that illustrates an example video coding system 10 that may utilize the techniques described in this disclosure. In this disclosure, the term "video coding" may refer to video encoding and video decoding. As shown in FIG. 1, video coding system 10 includes a source device 12 and a destination device 14. Source device 12 provides encoded video data to destination device 14. Destination device 14 may decode the encoded video data at a later time. Source device 12 and destination device 14 may comprise any of a wide range of devices, including desktop computers, notebook (i.e., laptop) computers, tablet computers, set-top boxes, mobile telephones, telephone handsets, "smart" pads, televisions, cameras, display devices, digital media players, video gaming consoles, video streaming devices, or types of computing devices capable of encoding and decoding video data.

Destination device 14 may receive the encoded video data via a communication channel 16. Communication channel 16 may comprise a medium or device capable of moving the encoded video data from source device 12 to destination device 14. In one example, communication channel 16 may comprise a communication medium that enables source device 12 to transmit encoded video data directly to destination device 14 in real-time. Source device 12 or another device may modulate the encoded video data according to a communication standard, such as a wireless communication protocol. The communication medium may comprise any wireless or wired communication medium, such as a radio frequency (RF) spectrum or one or more physical transmission lines. Communication channel 16 may form part of a packet-based network, such as a local area network, a wide-area network, or a global network such as the Internet. Communication channel 16 may include routers, switches, base stations, or any other equipment that may be useful to facilitate communication of the encoded video data from source device 12 to destination device 14.

In some examples, source device 12 and destination device 14 may be equipped for wireless communication. However, the techniques of this disclosure are not necessarily limited to wireless applications or settings. Rather, the techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, source device 12 and destination device 14 may be configured to support one-way or two-way video transmission to support applications such as video streaming, video playback, video broadcasting, and/or video telephony.

Furthermore, in some examples, source device 12 may output the encoded video data to a storage system 34. Similarly, destination device 14 may access encoded video data stored on storage system 34. In various examples, storage system 34 may include various distributed or locally accessed data storage media. Example types of data storage media include, but are not limited, to hard drives, Blu-ray discs, DVDs, CD-ROMs, solid state memory units, volatile or non-volatile memory, or other digital storage media suitable for storing encoded video data.

In some examples, storage system 34 may comprise a file server or another intermediate storage device that may hold the encoded video generated by source device 12. Destination device 14 may access stored video data from storage system 34 via streaming or download. The file server may be any type of server capable of storing encoded video data and transmitting that encoded video data to destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from storage system 34 may be a streaming transmission, a download transmission, or a combination of both.

In the example of FIG. 1, source device 12 includes a video source 18, a video encoder 20 and an output interface 22. In some examples, output interface 22 may also include a modulator and/or a transmitter. Video source 18 provides video data to video encoder 20. In various examples, video source 18 may comprise various types of devices and/or systems for providing video data. For example, video source 18 may comprise a video capture device, such as a video camera. In another example, video source 18 may comprise a video archive that contains previously captured video. In yet another example, video source 18 may comprise a video feed interface that receives video from a video content provider. In yet another example, video source 18 may comprise a computer graphics system for generating computer graphics data.

As described in detail below, video encoder 20 may encode the video data provided by video source 18. In some examples, source device 12 may transmit the encoded video data directly to destination device 14 via output interface 22. Moreover, in some examples, storage system 34 may store the encoded video data for later access by destination device 14 or other devices.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage system 34) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium at the time of encoding, which then may be retrieved by a decoding device at any time after being stored to this medium.

In the example of FIG. 1, destination device 14 includes an input interface 28, a video decoder 30, and a display device 32. In some examples, input interface 28 may include a receiver and/or a modem. Input interface 28 of destination device 14 receives encoded video data from communication channel 16 and/or storage system 34. Video decoder 30 decodes the encoded video data received by input interface 28. Destination device 14 may render the decoded video data for display on display device 32.

Display device 32 may be integrated with or may be external to destination device 14. In some examples, destination device 14 may include an integrated display device and also be configured to interface with an external display device. In various examples, display device 32 may comprise various types of display devices. For example, display device 32 may comprise a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Example extensions to standards include the scalable video coding (SVC) and Multiview Video Coding (MVC) extensions to the H.264/AVC standard. Other examples of video compression standards include MPEG-2 and ITU-T H.263. The techniques of this disclosure are not limited to any particular coding standard.

As mentioned briefly above, video encoder 20 encodes video data. The video data may comprise one or more sequences of pictures. Each of the pictures is a still image. In some instances, a picture may be referred to as a "frame." When video encoder 20 encodes the video data, video encoder 20 may generate a bitstream. The bitstream includes a sequence of bits that form a representation of coded pictures and associated data. A coded picture is a coded representation of a picture.

To generate the bitstream, video encoder 20 may perform an encoding operation for sequences of pictures in the video data. When video encoder 20 performs the encoding operation for a sequence of pictures, video encoder 20 may generate a series of coded pictures and associated data. In addition, video encoder 20 may generate a sequence parameter set that contains parameters applicable to the sequence of pictures. Furthermore, video encoder 20 may generate picture parameter sets (PPSs) that contain parameters applicable to the pictures as a whole. In some examples, video encoder 20 may generate adaptation parameter sets (APSs). An APS may contain parameters applicable to the picture as a whole.

To generate a coded picture, video encoder 20 may partition a picture into one or more treeblocks (sometimes referred to as a "block"). A treeblock is a two-dimensional (2D) block of video data. In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs).

In some examples, video encoder 20 may partition a picture into a plurality of slices. Each of the slices may include an integer number of CUs. In some instances, a slice comprises an integer number of treeblocks. In other instances, a boundary of a slice may be within a treeblock. In some examples, video encoder 20 may encode slices according to the size in bytes of the slices or according to the number of treeblocks in the slices.

As part of performing an encoding operation for a picture, video encoder 20 may perform encoding operations for each slice of the picture. The encoding operation for a slice may generate encoded data associated with the slice. The encoded data associated with the slice may be referred to as a "coded slice." The coded slice may include a slice header and slice data. The slice data may include a series of successive coding units in coding order. The slice header may contain data elements pertaining to the first or all treeblocks of the slice.

To generate the coded slice data for a slice, video encoder 20 may perform encoding operations on each treeblock in the slice. When video encoder 20 performs the encoding operation on a treeblock, video encoder 20 may generate a coded treeblock. The coded treeblock may comprise data representing an encoded version of the treeblock.

To generate the coded treeblock, video encoder 20 may recursively perform quadtree partitioning on the treeblock to divide the treeblock into progressively smaller CUs. For example, video encoder 20 may partition a treeblock into four equally-sized sub-CUs, partition one or more of the sub-CUs into four equally-sized sub-sub-CUs, and so on. One or more syntax elements in the bitstream may indicate a maximum number of times video encoder 20 may partition a treeblock. A CU may be square in shape.

Video encoder 20 may perform encoding operations on each non-partitioned CU in a treeblock. As part of performing an encoding operation on a non-partitioned CU, video encoder 20 may generate prediction data for the CU. Video encoder 20 may use intra prediction or inter prediction to generate the prediction data for the CU. When video encoder 20 uses intra prediction to generate the prediction data for the CU, video encoder 20 derives the prediction data for the CU from decoded samples of the picture that contains the CU. When video encoder 20 uses inter prediction to generate the prediction data for the CU, video encoder 20 derives the prediction data for the CU from decoded values of reference pictures other than the picture that contains the CU.

After video encoder 20 generates prediction data for a CU, video encoder 20 may calculate residual data for the CU. The residual data for the CU may indicate differences between pixel values in the prediction data for the CU and the original pixel values of the CU.

Each non-partitioned CU of a treeblock may have one or more transform units (TUs). Each TU of a CU may be associated with a different portion of the residual data of the CU. Video encoder 20 may perform a transform operation for each TU of the CU. When video encoder 20 performs the transform operation for a TU, video encoder 20 may generate a coefficient block at least in part by applying a transform to residual data associated with the TU.

Video encoder 20 may quantize the coefficients in a coefficient block and perform an entropy encoding operation on the coefficient block. After video encoder 20 performs entropy encoding on a coefficient block, video encoder 20 may include data representing the entropy encoded coefficient block in the bitstream for the video data. The bitstream may be a sequence of bits that forms a representation of coded pictures and associated data.

When video decoder 30 receives an encoded bitstream, video decoder 30 performs a decoding operation that is generally reciprocal to the encoding operation performed by video encoder 20. For instance, video decoder 30 may perform a decoding operation on each slice of the picture. When video decoder 30 performs the decoding operation on a slice of the picture, video decoder 30 may perform decoding operations on the treeblocks in the slice. When video decoder 30 completes the decoding operation on a treeblock, video decoder 30 has decoded the pixel values for the treeblock. When video decoder 30 has decoded the pixel values for each treeblock of a slice, video decoder 30 has reconstructed the pixel values for the slice.

Merge mode refers to one or more video coding modes in which motion information (such as motion vectors, reference frame indexes, prediction directions, or other information) of a neighboring video block are inherited for a current video block being coded. An index value may be used to identify a list of candidate neighbors from which the current video block inherits its motion information (e.g., a top, top right, left, left bottom block, relative to the current block, or a co-located block from a temporally adjacent frame (such as a temporal motion vector predictor, or TMVP, as discussed in greater detail, below). These candidates may be stored in a list, sometimes referred to as a merge candidate list. The merge candidate list can initially have a predetermined size. However, the list size may be reduced as a result of pruning (e.g., removing redundant or repeating list entries) or by truncation (e.g., if the video is coded to use a particular merge candidate list size). As the list size is reduced and candidates are deleted (or in situations that more candidates are inserted before TMVP), the TMVP may be removed from the list or not added to the list in some cases. However, various techniques, such as those described in greater detail below, may be utilized to generate the merge candidate list when merge mode is carried out over a parallel motion estimation region. For example, these techniques may be performed by the merge/MVP list generation module 121 illustrated in FIG. 2. Embodiments of such techniques are described in greater detail below with respect to FIGS. 4 through 17.

Skip mode may comprise one type of merge mode (or a mode similar to merge mode). With skip mode, motion information is inherited, but no residual information is coded. Residual information may generally refer to pixel difference information indicating pixel differences between the block to be coded and the block from which the motion information is inherited. Direct mode may be another type of merge mode (or mode similar to merge mode). Direct mode may be similar to skip mode in that motion information is inherited, but with direct mode, a video block is coded to include residual information. The phrase "merge mode" is used herein to refer to any one of these modes, which may be called skip mode, direct mode or merge mode.

Another case where the motion vector of a neighboring video block is used in the coding of a current video block is so-called motion vector prediction or advanced motion vector prediction (AMVP). In these cases, predictive coding of motion vectors is applied to reduce the amount of data needed to communicate the motion vector. For example, rather than encoding and communicating the motion vector itself, video encoder 20 encodes and communicates a motion vector difference (MVD) relative to a known (or knowable) motion vector. In H.264/AVC, the known motion vector, which may be used with the MVD to define the current motion vector, can be defined by a so-called motion vector predictor (MVP), which is derived as the median of motion vectors associated with neighboring blocks. However, more advanced MVP techniques, such as adaptive motion vector prediction (AMVP) may allow video encoder 20 to select the neighbor from which to define the MVP. Hence, the use of merge mode may refer to the use of motion information from another block to code a current block, with or without residual information indicating pixel differences between the block to be coded and the other block. The use of AMVP may refer to the use of motion vector information from another block, with the use of an MVD value to indicate the differences between the MVP and the actual MV of the block to be coded. Techniques for selection of a candidate block to obtain motion vector information may be the same or similar for merge mode and AMVP. As general background, in most video coding systems, motion estimation and motion compensation are used to reduce the temporal redundancy in a video sequence, in order to achieve data compression. In this case, a motion vector can be generated so as to identify a predictive block of video data, e.g., from another video frame or slice, which can be used to predict the values of the current video block being coded. The values of the predictive video block are subtracted from the values of the current video block to produce a block of residual data. The motion vector is communicated from video encoder 20 to video decoder 30, along with the residual data. Video decoder 30 can locate the same predictive block (based on the motion vector) and reconstruct the encoded video block by combining the residual data with the data of the predictive block. Many other compression techniques can also be used, such as transforms and entropy coding, to further improve the video compression.

Video encoder 20 usually performs the motion estimation process. Video encoder 20 may transmit motion information (such as motion vectors, motion vector indexes, prediction directions, or other information) to video decoder 30 so that video decoder 30 is able to identify a predictive block used to encode a given video block.

AMVP has been proposed to build a motion vector candidate set by including several neighboring blocks in spatial and temporal directions as candidates for MVP. In this case, video encoder 20 selects the most accurate predictor from the candidate set based on analysis of encoding rate and distortion (e.g., using so-called rate-distortion cost analysis). Video encoder 20 may also signal a motion vector predictor index (mvp_idx) to video decoder 30 to inform video decoder 30 where to locate the MVP. Video encoder 20 may also signal the MVD. Video decoder 30 may combine the MVD with the MVP (defined by the motion vector predictor index) so as to reconstruct the motion vector. Video decoder 30 (like video encoder 20) may define the set of candidate MVPs to which the index is applied based on various criteria.

Video Encoder

Figure 2:
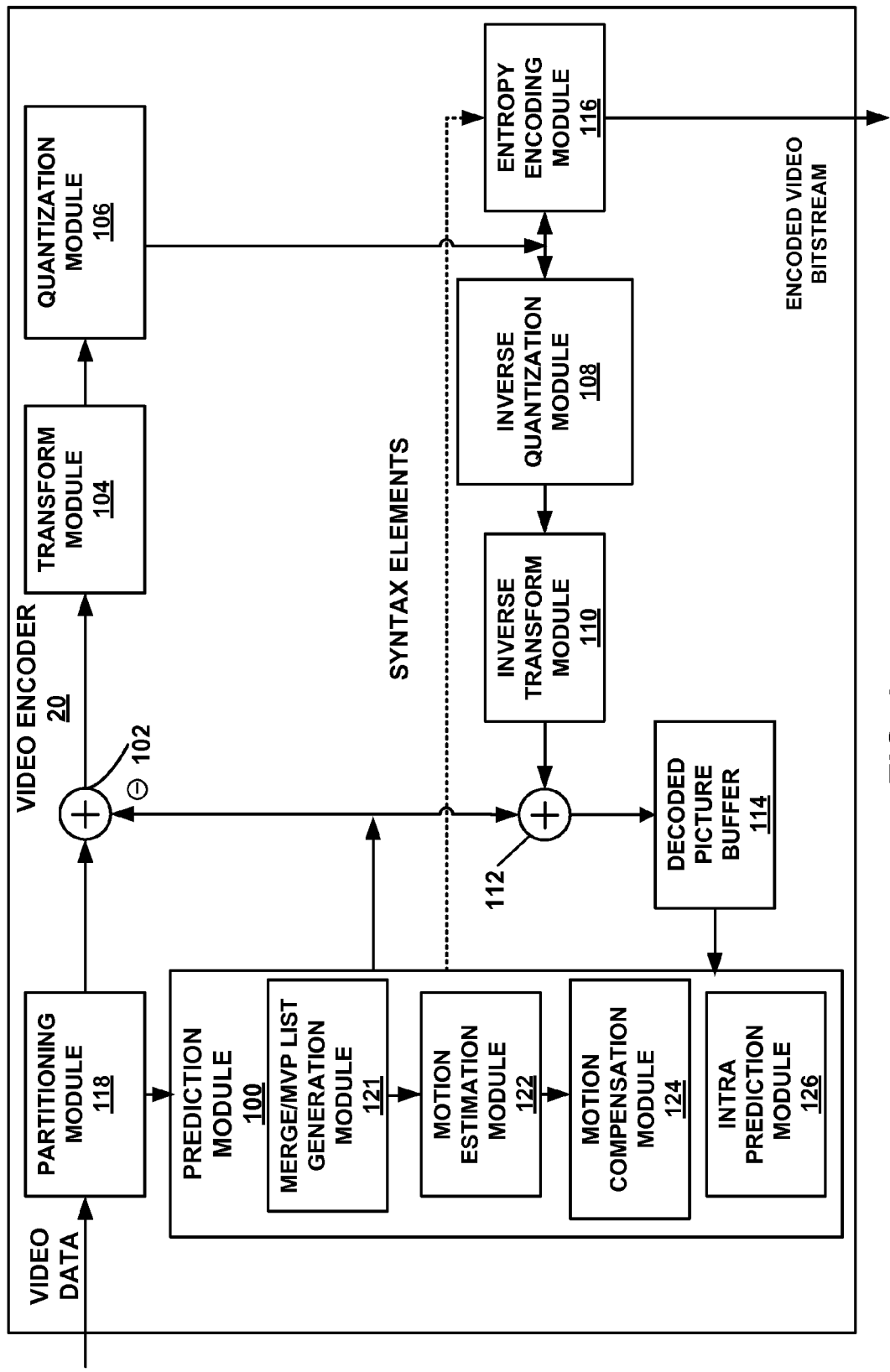
FIG. 2 is a block diagram that illustrates an example configuration of a video encoder.

FIG. 2 is a block diagram that illustrates an example configuration of video encoder 20. FIG. 2 is provided for purposes of explanation and is not limiting on the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, and a decoded picture buffer 114, an entropy encoding module 116, and a partitioning module 118. Prediction module 100 includes a merge/MVP list generation module 121, a motion estimation module 122, a motion compensation module 124, and an intra-prediction module 126. The merge/MVP list generation module 121 may generate a MV candidate list. For example, for a plurality of MV candidates corresponding to at least of a plurality of PUs partitioned in an MER, the merge/MVP list generation module 121 may select a subset of the plurality of MV candidates to include in a merge candidate list and generate the merge candidate list to include the selected subset of the plurality of motion vector candidates, as described in more detail below with respect to FIGS. 4-17.

In other examples, video encoder 20 may include more, fewer, or different functional components. For example, video encoder 20 may include a deblocking filter to filter the output of reconstruction module 112 to remove blockiness artifacts from reconstructed video. Furthermore, the merge/MVP list generation module 121, motion estimation module 122, and the motion compensation module 124 may be highly integrated, but are represented in the example of FIG. 2 separately for purposes of explanation.

Video encoder 20 may receive video data. In various examples, video encoder 20 may receive the video data from various sources. For example, video encoder 20 may receive the video data from video source 18 (FIG. 3) or another source. The video data may represent sequences of pictures. The pictures may include texture view and depth views. To encode the video data, video encoder 20 may perform an encoding operation on each sequence of pictures. As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. When video encoder 20 performs an encoding operation on a slice, video encoder 20 generates a coded slice. The coded slice is the slice in its encoded form. The coded slice may include a slice header and slice data. The slice header may contain syntax elements associated with the slice.

As part of performing an encoding operation on a slice, video encoder 20 may perform encoding operations on treeblocks in the slice. When video encoder 20 performs an encoding operation on a treeblock, video encoder 20 may generate a coded treeblock. The coded treeblock may comprise data representing an encoded version of a treeblock. In other words, the coded treeblock may be a treeblock in its encoded form.

As part of performing an encoding operation on a treeblock, partitioning module 118 may perform quadtree partitioning on the treeblock to divide the treeblock into progressively smaller CUs. For example, partitioning module 118 may partition a treeblock into four equally-sized sub-CUs, partition one or more of the sub-CUs into four equally-sized sub-sub-CUs, and so on.

The sizes of the CUs may range from 8×8 pixels up to the size of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value.

As part of performing the encoding operation for a treeblock, partitioning module 118 may generate a hierarchical quadtree data structure for the treeblock. For example, a treeblock may correspond to a root node of the quadtree data structure. If partitioning module 118 partitions the treeblock into four sub-CUs, the root node has four child nodes in the quadtree data structure. Each of the child nodes corresponds to one of the sub-CUs. If partitioning module 118 partitions one of the sub-CUs into four sub-sub-CUs, the node corresponding to the sub-CU may have four child nodes, each of which corresponds to one of the sub-sub-CUs.

Each node of the quadtree data structure may provide syntax data for the corresponding CU. For example, a node in the quadtree may include a split flag, indicating whether the CU corresponding to the node is partitioned (e.g., split) into four sub-CUs. Syntax elements for a CU may be defined recursively, and may depend on whether the CU is split into sub-CUs. A CU that is not partitioned may correspond to a leaf node in the quadtree data structure. A leaf node in the quadtree data structure may be referred to as a "coding node." A coded treeblock may include data based on the quadtree data structure for a corresponding treeblock. A coded treeblock is a treeblock in its encoded form. A coded treeblock corresponds to a treeblock when the coded treeblock is the treeblock in its encoded form.

Video encoder 20 may perform encoding operations on each non-partitioned CU of the treeblock. When video encoder 20 performs an encoding operation on a non-partitioned CU, video encoder 20 generates data representing an encoded version of the non-partitioned CU.

As part of performing an encoding operation on a CU, motion estimation module 122 and motion compensation module 124 may perform inter prediction on the CU. In other words, motion estimation module 122 and motion compensation module 124 may generate prediction data for the CU based on decoded samples of reference pictures other than the picture that contains the CU. Inter prediction may provide temporal compression.

To perform inter prediction on a CU, motion estimation module 122 may partition the CU into one or more prediction units (PUs). Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, motion estimation module 122 may partition a CU into PUs along a boundary that does not meet the sides of the CU at right angles.

Motion estimation module 122 may perform a motion estimation operation with regard to each PU of a CU. When motion estimation module 122 performs a motion estimation operation with regard to a PU, motion estimation module 122 may generate one or more motion vectors for the PU. For instance, slices may be I slices, P slices, or B slices. Motion estimation module 122 and motion compensation module 124 may perform different operations for a PU of a CU depending on whether the CU is in an I slice, a P slice, or a B slice. In an I slice, all CUs are intra predicted. Hence, if the CU is in an I slice, motion estimation module 122 and motion estimation module 124 do not perform inter prediction on the CU.

If the CU is in a P slice, the picture containing the CU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 searches the reference pictures in list 0 for a reference sample for the PU. The reference sample of the PU may be a set of pixel values that most closely corresponds to the pixels values of the PU. Motion estimation module 122 may use a variety of metrics to determine how closely a set of pixel values in a reference picture corresponds to the pixel values of a PU. For example, motion estimation module 122 may determine how closely a set of pixel values in a reference picture corresponds to the pixel values of a PU by sum of absolute difference (SAD), sum of square difference (SSD), or other difference metrics.

After identifying a reference sample of a PU of a CU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter pixel precision, one-eighth pixel precision, or other fractional pixel precision. Motion estimation module 122 may output motion information for the PU to entropy encoding module 116 and motion compensation module 124. The motion information for the PU may include the reference index and the motion vector of the PU. Motion compensation module 124 may use the motion information of PUs of the CU to identify and retrieve the reference samples of the PUs. Motion compensation module 124 may then use pixel values of reference samples of PUs to generate the prediction data for the CU.

If the CU is in a B slice, the picture containing the CU may be associated with two lists of reference pictures, referred to as "list 0" and "list 1." Each of the reference pictures in list 0 contains samples that may be used for inter prediction of subsequent pictures in decoding order. The reference pictures in list 1 occur before the picture in decoding order but after the picture in presentation order. In some examples, a picture containing a B slice may be associated with a list combination that is a combination of list 0 and list 1.

Furthermore, if the CU is in a B slice, motion estimation module 122 may perform uni-directional prediction or bi-directional prediction for PUs of the CU. When motion estimation module 122 performs uni-directional prediction for a PU, motion estimation module 122 may search the reference pictures of list 1 for a reference sample for the PU. Motion estimation module 122 may then generate a reference index that indicates the reference picture in list 1 that contains the reference sample and a motion vector that indicates a spatial displacement between the PU and the reference sample. Motion estimation module 122 may output motion information for PUs of the CU to entropy encoding module 116 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of PUs of the CU to identify and retrieve the reference samples of the PUs. Motion compensation module 124 may then use pixel values of reference samples of PUs to generate the prediction data for the CU.

When motion estimation module 122 performs bi-directional prediction for a PU, motion estimation module 122 may search the reference pictures in list 0 for a reference sample for the PU and may also search the reference pictures in list 1 for another reference sample for the PU. Motion estimation module 122 may then generate reference indexes that indicate the reference samples and motion vectors that indicate spatial displacements between the reference samples and the PU. Motion estimation module 122 may output motion information of the PU to entropy encoding module 116 and motion compensation module 124. The motion information for the PU may include the reference indexes and the motion vectors of the PU. Motion compensation module 124 may use the motion information to identify and retrieve the reference samples of the PUs. Motion compensation module 124 may then interpolate pixel values of the prediction data of the CU from pixel values in the reference samples of the PUs of the CU.

In some instances, motion estimation module 122 does not output a full set of motion information for the PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a quadtree node for the CU, a value that indicates to video decoder 30 that the PU has the same motion information as the neighboring PU. In another example, motion estimation module 122 may identify, in a quadtree node associated with the CU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to predict the motion vector of the PU.

As part of performing an encoding operation on a CU, intra prediction module 126 may perform intra prediction on the CU. In other words, intra prediction module 126 may generate prediction data for the CU based on decoded pixel values of other CUs. Intra prediction may provide spatial compression.

To perform intra prediction on a CU, intra prediction module 126 may use multiple intra prediction modes to generate multiple sets of prediction data for the CU. When intra prediction module 126 uses an intra prediction mode to generate a set of prediction data for a CU, intra prediction module 126 may extend pixel values from neighboring CUs across the CU in a direction and/or gradient associated with the intra prediction mode. The neighboring CUs may be above, above and to the right, above and to the left, or to the left of the CU, assuming a left-to-right, top-to-bottom encoding order for CUs and treeblocks. Intra prediction module 126 may use various numbers of intra prediction modes, e.g., 33 directional intra prediction modes, depending on the size of the CU.

Intra prediction module 126 may select one of the sets of prediction data for the CU. In various examples, intra prediction module 126 may select the set of prediction data for the CU in various ways. For example, intra prediction module 126 may select the set of prediction data for the CU by calculating distortion rates for the sets of prediction data and selecting the set of prediction data that has the lowest distortion rate.

Prediction module 100 may select the prediction data for a CU from among the prediction data generated by motion compensation module 124 for the CU or the prediction data generated by intra prediction module 126 for the CU. In some examples, prediction module 100 selects the prediction data for the CU based on error (e.g., distortion) in the sets of prediction data.

After prediction module 100 selects the prediction data for a CU, residual generation module 102 may generate residual data for the CU by subtracting the selected prediction data of the CU from the pixel values of the CU. The residual data of a CU may include 2D residual blocks that correspond to different pixel components of the pixels in the CU. For example, the residual data may include a residual block that corresponds to differences between luminance components of pixels in the prediction data of the CU and luminance components of pixels in the original pixels of the CU. In addition, the residual data of the CU may include residual blocks that correspond to the differences between chrominance components of pixels in the prediction data of the CU and the chrominance components of the original pixels of the CU.

A CU may have one or more transform units (TUs). Each TU of a CU may correspond to a different portion of the residual data of the CU. The sizes of the TUs of a CU may or may not be based on the sizes of PUs of the CU. In some examples, a CU may be subdivided into smaller units using a quadtree structure known as a "residual quad tree" (RQT). The TUs may correspond to nodes of the RQT.

Transform module 104 may generate one or more coefficient blocks for each non-partitioned TU of a CU by applying a transform to the residual data corresponding to the non-partitioned TU. Each of the coefficient blocks may be a 2D matrix of coefficients. In various examples, transform module 104 may apply various transforms to the residual data corresponding to a TU. For example, transform module may apply a discrete cosine transform (DCT), a directional transform, or a conceptually similar transform.

After transform module 104 generates a coefficient block for a TU, quantization module 106 may quantize the coefficients in the coefficient block. Quantization generally refers to a process in which coefficients in a coefficient block are quantized to possibly reduce the amount of data used to represent the coefficients, providing further compression. Quantization may reduce the bit depth associated with some or all of the coefficients. For example, an n-bit value may be rounded down to an m-bit value during quantization, where n is greater than m.

Inverse quantization module 108 and inverse transform module 110 may apply inverse quantization and inverse transformation to the coefficient block, respectively, to reconstruct residual data from the coefficient block. Reconstruction module 112 may add the reconstructed residual data to the prediction data generated by motion compensation module 124 or intra prediction module 126 to produce a reconstructed video block for storage in decoded picture buffer 114. Motion estimation module 122 and motion compensation module 124 may use a reference picture that contains the reconstructed video block to perform inter prediction on CUs of subsequent pictures. In addition, intra prediction module 126 may use reconstructed pixel values of CUs of the current picture to perform intra prediction.

Entropy encoding module 116 may receive data from other functional components of video encoder 20. For example, entropy encoding module 116 may coefficient blocks from quantization module 106 and may receive syntax elements from prediction module 100. When entropy encoding module 116 receives data, entropy encoding module 116 may perform one or more entropy encoding operations to generate entropy encoded data. For example, video encoder 20 may perform a context adaptive variable length coding (CAVLC) operation, a Context-Adaptive Binary Arithmetic Coding (CABAC) operation, a syntax-based context-adaptive binary arithmetic coding (SBAC) operation, a Probability Interval Partitioning Entropy (PIPE) coding operation, or another type of entropy encoding operation on the data.

To perform CABAC, entropy encoding module 116 may assign a context within a context model to a symbol to be transmitted. The context may relate to, for example, whether neighboring values of the symbol are non-zero or not. To perform CAVLC, entropy encoding module 116 may select a variable length code for a symbol to be transmitted. Codewords in VLC may be constructed such that relatively short codes correspond to more probable symbols, while relatively long codes correspond to less probable symbols. In this way, the use of VLC may achieve a bit savings over using equal-length codewords for each symbol to be transmitted. The probability determination may be based on a context assigned to the symbol.

Entropy encoding module 116 may output a bitstream. The bitstream may be a sequence of bits that forms a representation of coded pictures and associated data. The bitstream may comprise a sequence of network abstraction layer (NAL) units. Each of the NAL units may be a syntax structure containing an indication of a type of data in the NAL unit and bytes containing the data. For example, a NAL unit may contain data representing a PPS, an APS, a coded slice, supplemental enhancement information, an access unit delimiter, filler data, or another type of data. The data of a NAL unit may be in the form of a raw byte sequence payload (RBSP) interspersed with emulation prevention bits. A RBSP may be a syntax structure containing an integer number of bytes that is encapsulated within a NAL unit.

Entropy encoding module 116 outputs a bitstream that includes a series of NAL units. As discussed above, each of the NAL units may be a syntax structure containing an indication of a type of data in the NAL unit and bytes containing the data. Each coded slice NAL unit in the bitstream contains a coded slice. A coded slice includes a coded slice header and slice data. The slice data may include coded treeblocks. The coded treeblocks may include one or more coded CUs. Each coded CU may include one or more entropy-encoded coefficient blocks.

Video Decoder

Figure 3:
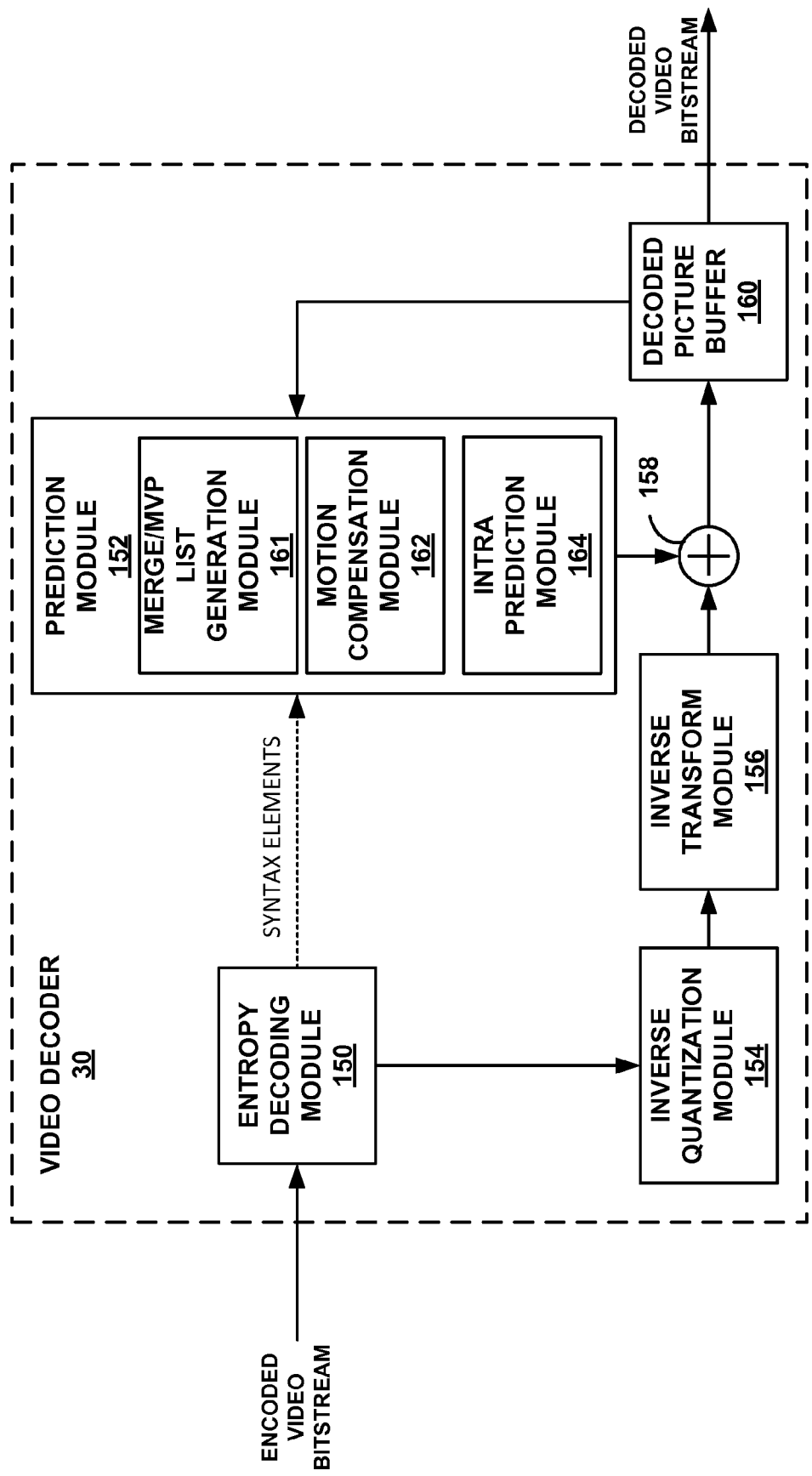
FIG. 3 is a block diagram that illustrates an example configuration of a video decoder.

FIG. 3 is a block diagram that illustrates an example configuration of video decoder 30. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, and a decoded picture buffer 160. Prediction module 152 includes a merge/MVP list generation module 161, a motion compensation module 162 and an intra prediction module 164. The merge/MVP list generation module 161 may generate MV candidate lists. In some examples, video decoder 30 may perform a decoding pass generally reciprocal to the encoding pass described with respect to video encoder 20 of FIG. 2. In other examples, video decoder 30 may include more, fewer, or different functional components. For example, video decoder 30 may include a deblocking filter to filter the output of reconstruction module 158 to remove blockiness artifacts from reconstructed video.

Video decoder 30 may receive a bitstream that comprises encoded video data. When video decoder 30 receives the bitstream, entropy decoding module 150 performs a parsing operation on the bitstream. As a result of performing the parsing operation on the bitstream, entropy decoding module 150 may generate entropy-decoded syntax elements. The entropy-decoded syntax elements may include entropy-decoded coefficient blocks. Prediction module 152, inverse quantization module 154, inverse transform module 156, and reconstruction module 158 may perform a decoding operation that uses the syntax elements to generate decoded video data.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on. A sequence parameter set is a syntax structure that contains syntax elements that apply to zero or more entire coded video sequences. A picture parameter set is a syntax structure containing syntax elements that apply to zero or more entire coded pictures. A picture parameter set associated with a given picture may include a syntax element that identifies a sequence parameter set associated with the given picture.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded coefficient blocks. Entropy decoding module 150 may then perform entropy decoding operations on the syntax elements. For instance, entropy decoding module 150 may perform CABAC operations on the coefficient blocks.

When entropy decoding module 150 performs an entropy decoding operation on a set of data, entropy decoding module 150 may select a context model. In examples where entropy decoding module 150 uses CABAC, the context model may indicate probabilities of particular bins. In examples where entropy decoding module 150 uses CAVLC, the context model may indicate a mapping between codewords and the corresponding data. Entropy decoding module 150 may then use the selected context model to perform the entropy decoding operation on the set of data.

After entropy decoding module 150 performs a parsing operation on a non-partitioned CU, video decoder 30 may perform a decoding operation on the non-partitioned CU. To perform the decoding operation on a non-partitioned CU, video decoder 30 may, at each level of the residual quadtree of the CU, perform a decoding operation on each TU of the CU. By performing the decoding operation for each TU of the CU, video decoder 30 may reconstruct the residual data of the CU.

As part of performing a decoding operation on a non-partitioned TU, inverse quantization module 154 may inverse quantize, i.e., de-quantize, the coefficient blocks associated with the TU. Inverse quantization module 154 may inverse quantize the coefficient blocks in a manner similar to the inverse quantization processes proposed for HEVC or defined by the H.264 decoding standard. Inverse quantization module 154 may use a quantization parameter $QP_Y$ calculated by video encoder 20 for a CU of the coefficient block to determine a degree of quantization and, likewise, a degree of inverse quantization for inverse quantization module 154 to apply.

After inverse quantization module 154 inverse quantizes a coefficient block, inverse transform module 156 may generate residual data for the TU associated with the coefficient block. Inverse transform module 156 may generate the residual data for the TU at least in part by applying an inverse transform to the coefficient block. For example, inverse transform module 156 may apply an inverse DCT, an inverse integer transform, an inverse Karhunen-Loeve transform (KLT), an inverse rotational transform, an inverse directional transform, or another inverse transform to the coefficient block. In some examples, inverse transform module 156 may determine an inverse transform to apply to the coefficient block based on signaling from video encoder 20. In such examples, inverse transform module 156 may determine the inverse transform based on a signaled transform at the root node of a quadtree for a treeblock associated with the coefficient block. In other examples, inverse transform module 156 may infer the inverse transform from one or more coding characteristics, such as block size, coding mode, or the like. In some examples, inverse transform module 156 may apply a cascaded inverse transform.

If the CU was encoded using inter prediction, motion compensation module 162 may perform motion compensation to generate prediction data for the CU. Motion compensation module 162 may use motion information for the PUs of the CU to identify reference samples for the PUs. The motion information for a PU may include a motion vector, a reference picture index, and a prediction direction. Motion compensation module 162 may then use the reference samples for the PUs to generate prediction data for the CU.

In some examples, motion compensation module 162 may refine the prediction data for a CU by performing interpolation based on interpolation filters. Identifiers for interpolation filters to be used for motion compensation with sub-pixel precision may be included in the syntax elements. Motion compensation module 162 may use the same interpolation filters used by video encoder 20 during generation of the prediction data of the CU to calculate interpolated values for sub-integer pixels of a reference block. Motion compensation module 162 may determine the interpolation filters used by video encoder 20 according to received syntax information and use the interpolation filters to produce prediction data.

If a CU is encoded using intra prediction, intra prediction module 164 may perform intra prediction to generate prediction data for the CU. For example, intra prediction module 164 may determine an intra prediction mode for the CU based on syntax elements in the bitstream. Intra prediction module 164 may then use the intra prediction mode to generate prediction data (e.g., predicted pixel values) for the CU based on the pixel values of neighboring CUs.

Reconstruction module 158 may use the residual data of a CU and the prediction data for the CU to reconstruct pixel values for the CU. In some examples, video decoder 30 may apply a deblocking filter to remove blockiness artifacts from the reconstructed pixel values filter of a slice or picture. Decoded picture buffer 160 may store the decoded pixel values for pictures of the video data. Decoded picture buffer 160 may provide reference pictures for subsequent motion compensation, intra prediction, and presentation on a display device, such as display device 34 of FIG. 3. It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Merle Motion Vector (MV) Candidates

Figure 4:
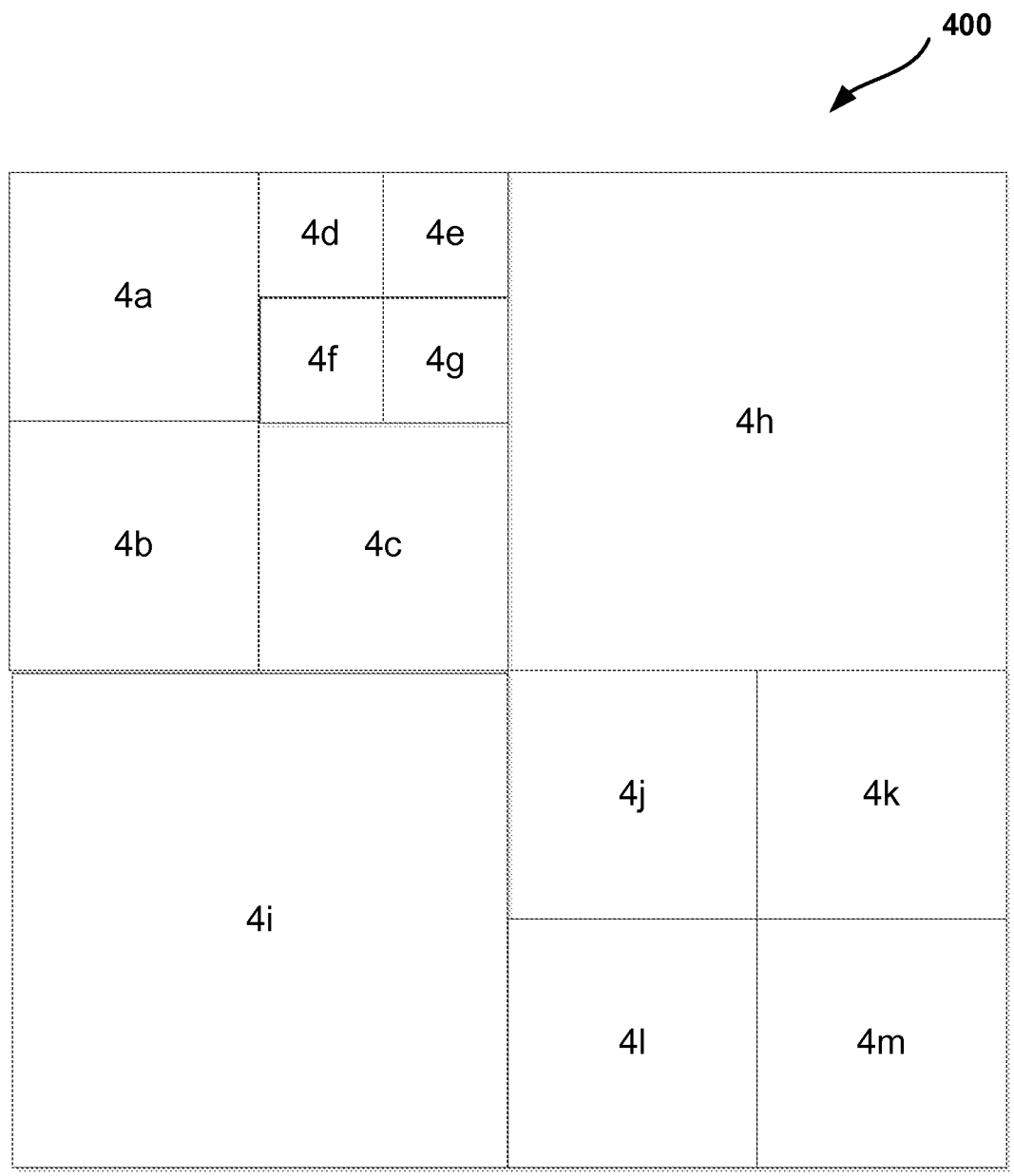
FIG. 4 shows an example of decomposition of a largest coding unit (LCU) into coding units (CUs).

As discussed above, in various embodiments, the sizes of the CUs may range from 8×8 pixels up to the size of the treeblock with a maximum of 64×64 pixels or greater. FIG. 4 shows an example of a largest coding unit (LCU) 400 partitioned into coding units (CUs). For example, LCU 400 can be partitioned into CU blocks 4i and 4h each of size 32×32 pixels. Similarly, a 32×32 CU block can be partitioned into four 16×16 CU blocks. For example, CUs 4a, 4b, 4c, 4j, 4k, 4l and 4m can each correspond to a 16×16 CU. Similarly, a 16×16 CU block can be partitioned into four 8×8 pixel CU blocks. For example, CUs 4d, 4e, 4f, and 4g can each correspond to an 8×8 CU.

Figure 5A:
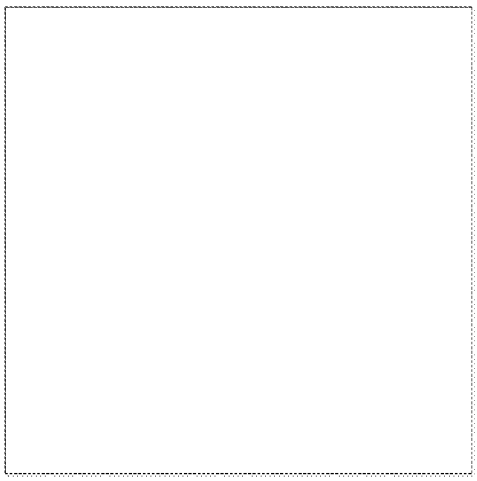
FIGS. 5A-5D show examples of decomposition of a CU into prediction units (PUs).
Figure 5B:
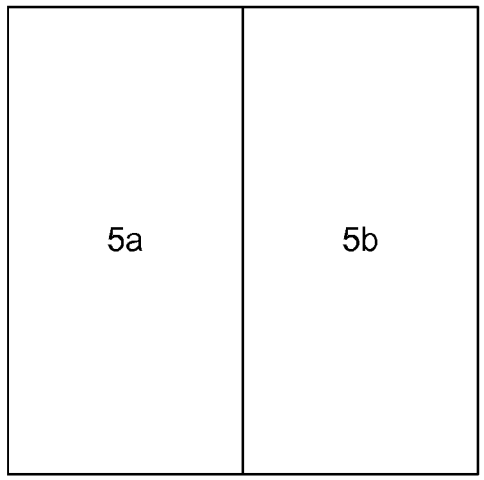
Figure 5C:
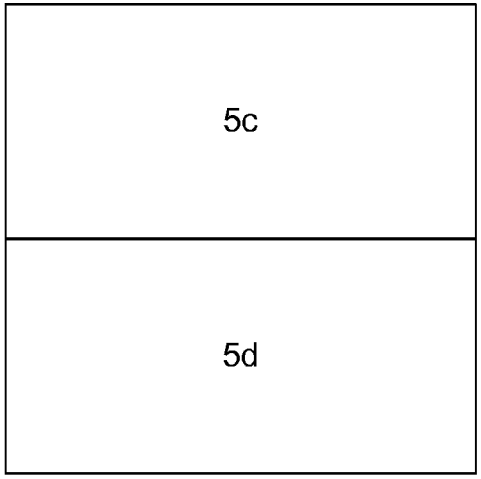
Figure 5D:
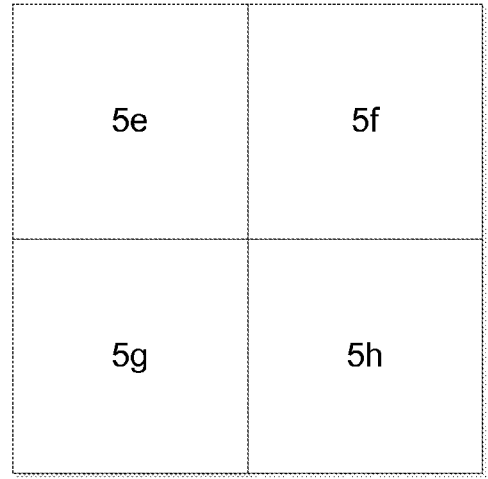

FIGS. 5A-5D show examples of a CU partitioned into different prediction units (PUs). In particular, a CU 500 can be partitioned into several different PUs. For example, as shown in FIG. 5A, a 2N×2N CU 500 can be partitioned into a single 2N×2N PU. In addition, as shown in FIG. 5B, the 2N×2N CU 500 can also be partitioned into two 2N×N PUs, a left 2N×N PU 5a and a right 2N×N PU 5b. As shown in FIG. 5C, the 2N×2N CU 500 can also be partitioned into two N×2N PUs, a top N×2N PU 5c and a bottom N×2N PU 5d. As shown in FIG. 5D, the 2N×2N CU 500 can also be partitioned into four N×N PUs, a top-left N×N PU 5e, a top-right N×N PU 5f, a bottom-left N×N PU 5g, and a bottom-right N×N PU 5h.

Figure 6:
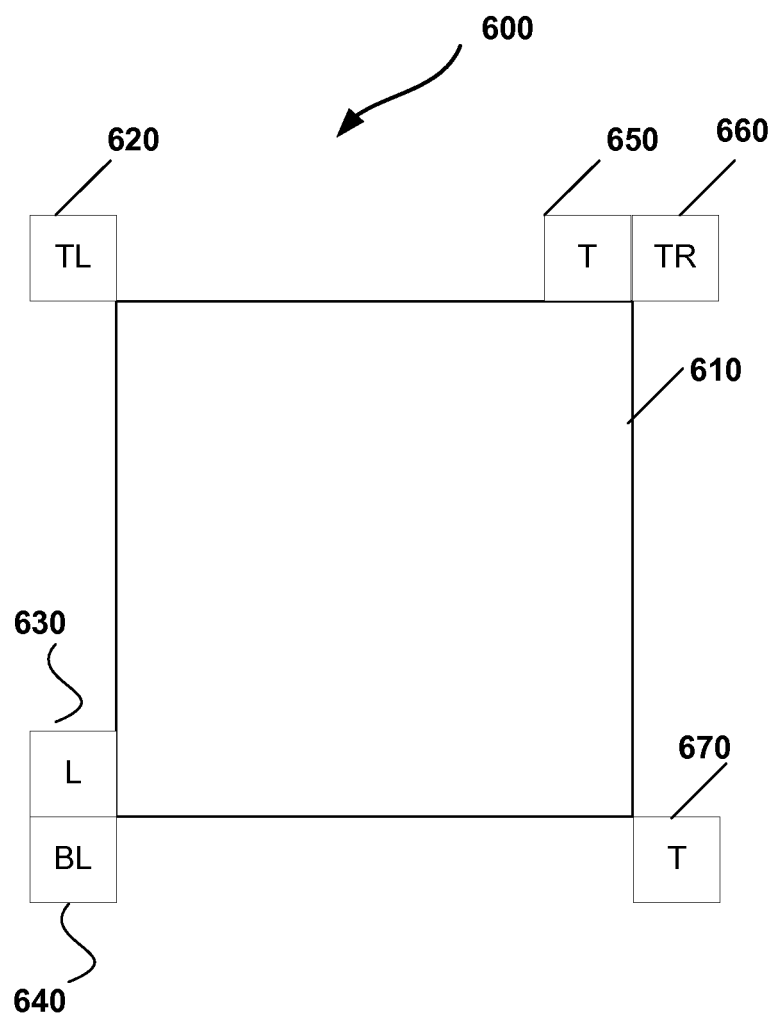
FIG. 6 is a block diagram illustrating example motion vector (MV) candidate positions.

As discussed above, during certain coding modes, a list of motion vector candidates may be generated and one or more of the motion vectors may be used to determine the value of a current video block. As shown in FIG. 6, the motion vector candidates may include motion vector information from one or more spatially neighboring video blocks (e.g., bottom-left (BL 640), left (L 630), top-left (TL 620), top (T 650), and top-right (TR 660)) as well as one temporally neighboring, co-located video block (e.g., a temporal motion vector predictor, or TMVP (T 670)). These spatially neighboring video blocks 620, 630, 640, 650, and 660 and the TMVP 670 are illustrated in FIG. 6. In some embodiments, the current video block 610 (e.g., the video block that is being coded) may inherit or otherwise use the motion information (e.g., motion vectors) of a selected neighboring video block. For example, as illustrated in FIG. 6, video encoder (such as video encoder 20) does not signal the motion vector itself for a video block 610 coded in merge mode. Rather, an index value (e.g., index values 0 to 4) may be used to identify the neighboring video blocks (such as a bottom-left neighbor 640, left neighbor 630, left-above neighbor 620, above neighbor 650, or right-above neighbor 660) from which the current video block 610 inherits its motion vector and motion information.

In some embodiments, a merge candidate list (also called a merge MV candidate list or a MV candidate list) can have five entries and up to four spatial motion vector candidates added to the merge candidate list (although in other embodiments, the candidate list may have more or less than five entries and have more or less than four spatial candidates added to the merge candidate list). Index values for the five entries in the merge candidate list start at 0 and end at 4. The merge candidates may include spatial candidates, for example as defined in HEVC, and other types of candidates. Each spatial MV can be equal to or derived from any spatially neighboring video block (e.g., blocks 620, 630, 640, 650, 660) to the current video block (e.g., block 610). In some embodiments, if some merge candidates are not available, (or if they are pruned or otherwise removed from the MV candidate list) other candidates can be selected.

Determination of MV Candidates Corresponding to a Given CU

In parallel motion estimation, motion estimation can be performed in parallel for skip mode, merge mode, and regular or normal intra-prediction mode for multiple PUs in a CU or for multiple CUs in a LCU. With parallel motion estimation, motion estimation for the PUs inside a CU can be done in parallel while motion estimation between CU to CU is sequential.

Figure 7C:
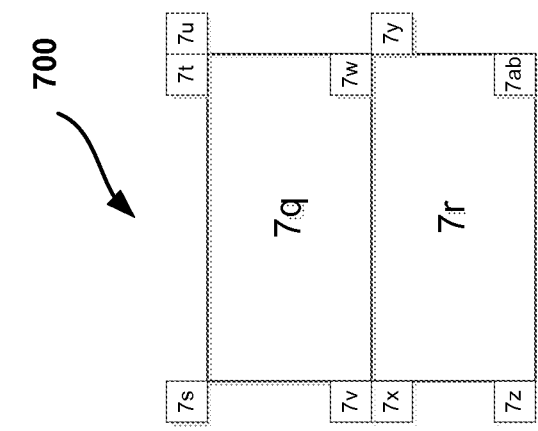
FIGS. 7A-7C illustrate an example CU decomposition showing MV candidate positions for some PUs.
Figure 7B:
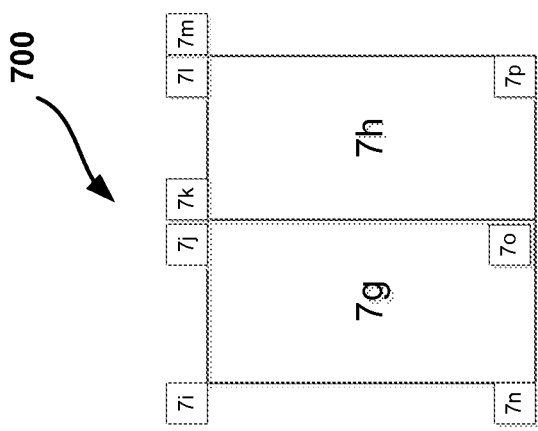
Figure 7A:
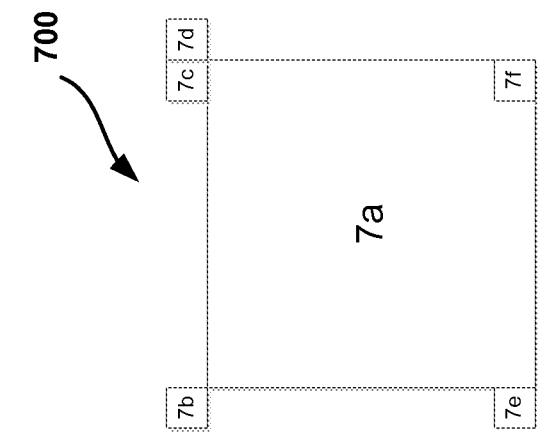

FIGS. 7A-7C illustrate an example CU partitioned into PUs and showing MV candidate positions for some PUs. In particular, as an example FIGS. 7A-7C illustrate a 32×32 CU 700. The methods described herein with respect to CU 700 are applicable to determining MV candidate positions for PUs partitioned within CUs of other sizes, including a 64×64 CU, a 16×16 CU, and an 8×8 CU, among others.

As shown in FIG. 7A, the largest PU that can be partitioned within the 32×32 CU 700 is a PU 7a having a size 32×32. MV candidates may be generated that correspond to the PU 7a. For example, MV candidates corresponding to PU 7a include spatial candidates top-left MV candidate 7b, top MV candidate 7c, a top-right MV candidate 7d, a left MV candidate 7e, and temporal MV candidate 7f In this example, each of the MV candidates have a size of 4×4, including top-left MV candidate 7b, top MV candidate 7c, a top-right MV candidate 7d, and a left MV candidate 7e. In other embodiments, MV candidates can have varying sizes.

As shown in FIG. 7B, the CU 700 can be partitioned into a left PU 7g and a right PU 7h each having a size 32×16. MV candidates that may be generated that correspond to the PU 7g include spatial candidates top-left MV candidate 7i, top MV candidate 7j, a top-right MV candidate 7k, a left MV candidate 7n, and temporal MV candidate 7o. MV candidates that may be generated that correspond to the PU 7h include spatial candidates top-left MV candidate 7j, top MV candidate 7l, a top-right MV candidate 7m, a left MV candidate 7g, and temporal MV candidate 7p. A single MV candidate can serve as an MV candidate for more than one PU. For example, MV candidate 7j is the top MV candidate for PU 7g, whereas MV candidate 7j is also the top-left MV candidate for PU 7h.

As shown in FIG. 7C, the CU 700 can be partitioned into a top PU 7q and a bottom PU 7r each having a size 16×32. MV candidates that may be generated that correspond to the PU 7q include spatial candidates top-left MV candidate 7s, top MV candidate 7t, a top-right MV candidate 7u, a left MV candidate 7v, a bottom-left MV candidate 7x, and temporal MV candidate 7y. MV candidates that may be generated that correspond to the PU 7r include spatial candidates top-left MV candidate 7v, top MV candidate 7w, a left MV candidate 7z, and temporal MV candidate lab. As before, a single MV candidate can serve as an MV candidate for more than one PU. For example, MV candidate 7v is the left MV candidate for PU 7q, whereas MV candidate 7v is also the top-left MV candidate for PU 7r.

In this example, CU 700, which has a size of 32×32, can be partitioned into four smaller non-overlapping 16×16 CUs. For example, CU 700 can be partitioned into a top-left 16×16 CU 710, a top-right 16×16 CU 720, a bottom-left 16×16 CU 730, and a bottom-right 16×16 740, as shown in FIGS. 8-15.

Figure 8A:
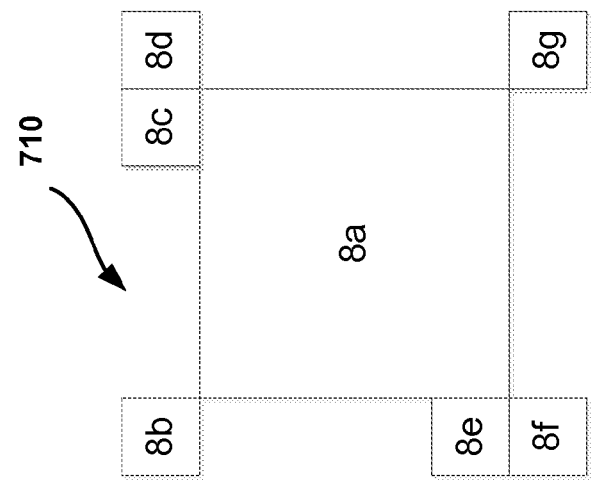
FIGS. 8A-8C illustrate another example CU decomposition showing MV candidate positions for some PUs.
Figure 8B:
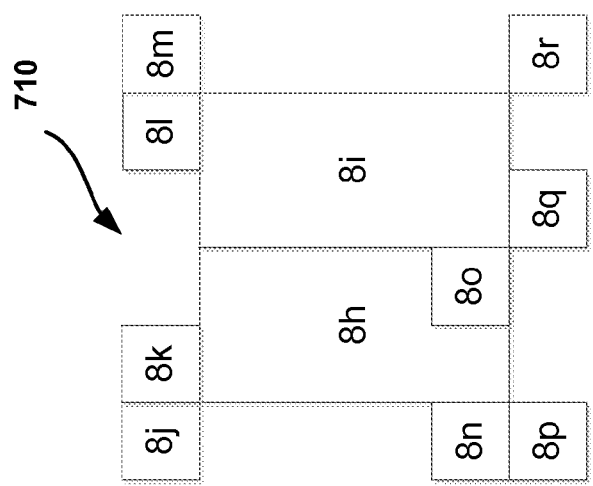
Figure 8C:
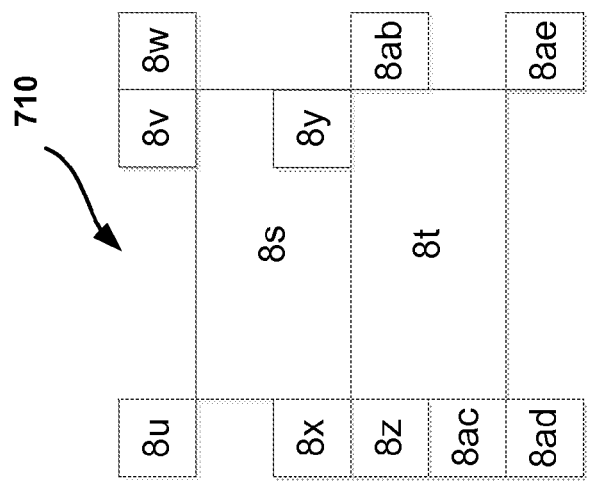

FIGS. 8A-8C illustrate an example CU partitioning into PUs and showing MV candidate positions for some PUs. In particular, as an example FIGS. 8A-8C illustrate the top-left 16×16 CU 710.

As shown in FIG. 8A, the largest PU that can be partitioned within the 16×16 CU 710 is a PU 8a having a size 16×16. MV candidates may be generated that correspond to the PU 8a. For example, MV candidates corresponding to PU 8a include spatial candidates top-left MV candidate 8b, top MV candidate 8c, a top-right MV candidate 8d, left MV candidate 8e, bottom-left MV candidate 8f, and temporal MV candidate 8g. In this example, each of the MV candidates have a size of 4×4, including top-left MV candidate 8b, top MV candidate 8c, a top-right MV candidate 8d, left MV candidate 8e, and bottom-left MV candidate 8f In other embodiments, MV candidates can have different sizes.

As shown in FIG. 8B, the CU 710 can be partitioned into a left PU 8h and a right PU 8i each having a size 16×8. MV candidates that may be generated that correspond to the PU 8h include spatial candidates top-left MV candidate 8j, top MV candidate 8k, a top-right MV candidate 8l, a left MV candidate 8n, a bottom-left MV candidate 8p, and temporal MV candidate 8q. It is not necessary that every spatial MV candidate be directly adjacent to a boundary of a corresponding PU. For example, even though the top-right MV candidate 8l for PU 8h is not directly adjacent to the boundary of PU 8h, candidate 8l may still serve as a spatial MV candidate with respect to PU 8h. MV candidates that may be generated that correspond to the PU 8i include spatial candidates top-left MV candidate 8k, top MV candidate 8l, a top-right MV candidate 8m, a left MV candidate 8o, and temporal MV candidate 8r. A single MV candidate can serve as an MV candidate for more than one PU. For example, MV candidate 8k is the top MV candidate for PU 8h, whereas MV candidate 8k is also the top-left MV candidate for PU 8i.

As shown in FIG. 8C, the CU 710 can be partitioned into a top PU 8s and a bottom PU 8t each having a size 8×16. MV candidates that may be generated that correspond to the PU 8s include spatial candidates top-left MV candidate 8u, top MV candidate 8v, a top-right MV candidate 8w, a left MV candidate 8x, a bottom-left MV candidate 8z, and temporal MV candidate 8ab. MV candidates that may be generated that correspond to the PU 8t include spatial candidates top-left MV candidate 8x, top MV candidate 8y, a left MV candidate 8ac, a bottom-left MV candidate 8ad, and temporal MV candidate 8ae. As before, a single MV candidate can serve as an MV candidate for more than one PU. For example, MV candidate 8x is the left MV candidate for PU 8s, whereas MV candidate 8x is also the top-left MV candidate for PU 8t.

Figure 9C:
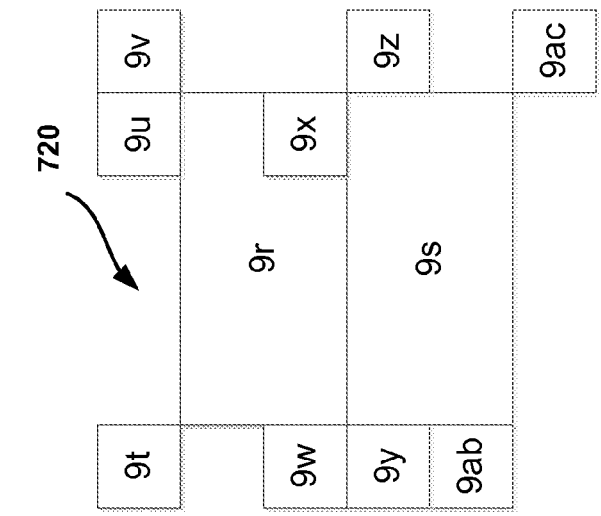
FIGS. 9A-9C illustrate another example CU decomposition showing MV candidate positions for some PUs.
Figure 9B:
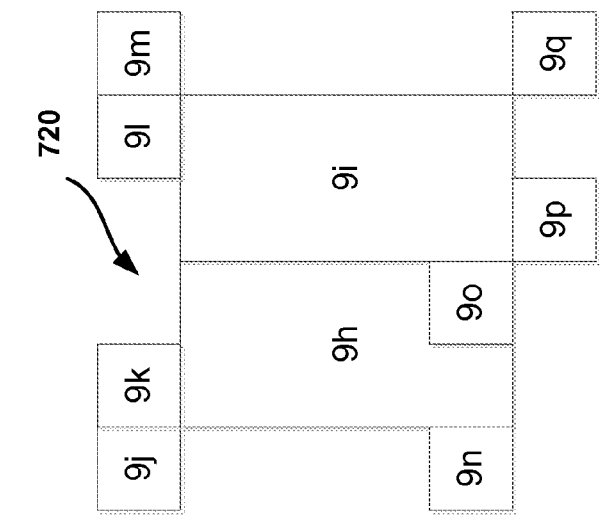
Figure 9A:
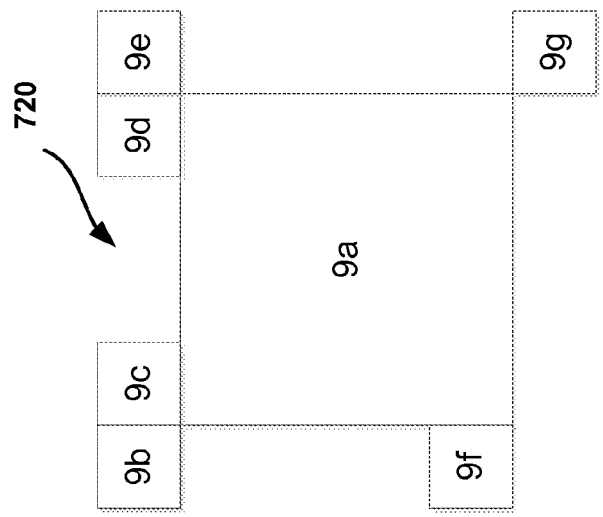

FIGS. 9A-9C illustrate an example CU partitioning into PUs and showing MV candidate positions for some PUs. In particular, as an example FIGS. 9A-9C illustrate the top-right 16×16 CU 720.

As shown in FIG. 9A, the largest PU that can be partitioned within the 16×16 CU 720 is a PU 9a having a size 16×16. MV candidates may be generated that correspond to the PU 9a. For example, MV candidates corresponding to PU 9a include spatial candidates top-left MV candidate 9b, top MV candidate 9d, a top-right MV candidate 9e, a left MV candidate 9f, and a temporal MV candidate 9g. In this example, each of the MV candidates have a size of 4×4, including top-left MV candidate 9b, top MV candidate 9d, a top-right MV candidate 9e, and a left MV candidate 9f In other embodiments, MV candidates can have different sizes.

As shown in FIG. 9B, the CU 720 can be partitioned into a left PU 9h and a right PU 9i each having a size 16×8. MV candidates that may be generated that correspond to the PU 9h include spatial candidates top-left MV candidate 9j, top MV candidate 9k, a top-right MV candidate 9l, a left MV candidate 9n, and a temporal MV candidate 9p. MV candidates that may be generated that correspond to the PU 9i include spatial candidates top-left MV candidate 9k, top MV candidate 9l, a top-right MV candidate 9m, a left MV candidate 9o, and temporal MV candidate 9q. A single MV candidate can serve as an MV candidate for more than one PU. For example, MV candidate 9k is the top MV candidate for PU 9h, whereas MV candidate 9k is also the top-left MV candidate for PU 9i.

As shown in FIG. 9C, the CU 720 can be partitioned into a top PU 9r and a bottom PU 9s each having a size 8×16. MV candidates that may be generated that correspond to the PU 9r include spatial candidates top-left MV candidate 9t, top MV candidate 9u, a top-right MV candidate 9v, a left MV candidate 9w, a bottom-left MV candidate 9y, and temporal MV candidate 9z. MV candidates that may be generated that correspond to the PU 9s include spatial candidates top-left MV candidate 9w, top MV candidate 9x, a left MV candidate 9ab, and temporal MV candidate 9ac. As before, a single MV candidate can serve as an MV candidate for more than one PU. For example, MV candidate 9w is the left MV candidate for PU 9r, whereas MV candidate 9w is also the top-left MV candidate for PU 9s.

FIGS. 10A-10C illustrate an example CU partitioning into PUs and showing MV candidate positions for some PUs. In particular, as an example FIGS. 10A-10C illustrate the bottom-left 16×16 CU 730.

As shown in FIG. 10A, the largest PU that can be partitioned within the 16×16 CU 730 is a PU 10a having a size 16×16. MV candidates may be generated that correspond to the PU 10a. For example, MV candidates corresponding to PU 10a include spatial candidates top-left MV candidate 10b, top MV candidate 10c, a top-right MV candidate 10d, a left MV candidate 10e, and a temporal MV candidate 10f. In this example, each of the MV candidates have a size of 4×4, including top-left MV candidate 10b, top MV candidates 10c, a top-right MV candidate 10d, and a left MV candidate 10e. In other embodiments, MV candidates can have different sizes.

As shown in FIG. 10B, the CU 730 can be partitioned into a left PU 10g and a right PU 10h each having a size 16×8. MV candidates that may be generated that correspond to the PU 10g include spatial candidates top-left MV candidate 10i, a top MV candidate 10j, a top-right MV candidate 10k, a left MV candidate 10n, and a temporal MV candidate 10o. MV candidates that may be generated that correspond to the PU 10h include spatial candidates top-left MV candidate 10j, top MV candidate 10l, a top-right MV candidate 10m, a left MV candidate 10g, and temporal MV candidate 10p. A single MV candidate can serve as an MV candidate for more than one PU. For example, MV candidate 10j is the top MV candidate for PU 10g, whereas MV candidate 10j is also the top-left MV candidate for PU 10h.

As shown in FIG. 10C, the CU 730 can be partitioned into a top PU 10q and a bottom PU 10r each having a size 8×16. MV candidates that may be generated that correspond to the PU 10q include spatial candidates top-left MV candidate 10s, a top MV candidate 10t, a top-right MV candidate 10u, a left MV candidate 10v, a bottom-left MV candidate 10x, and temporal MV candidate 10y. MV candidates that may be generated that correspond to the PU 10r include spatial candidates top-left MV candidate 10v, a top MV candidate 10w, a left MV candidate 10z, and temporal MV candidate 10ab. As before, a single MV candidate can serve as an MV candidate for more than one PU. For example, MV candidate 10v is the left MV candidate for PU 10q, whereas MV candidate 10v is also the top-left MV candidate for PU 10r.

FIGS. 11A-11C illustrate an example CU partitioning into PUs and showing MV candidate positions for some PUs. In particular, as an example FIGS. 11A-11C illustrate the bottom-right 16×16 CU 740.

As shown in FIG. 11A, the largest PU that can be partitioned within the 16×16 CU 740 is a PU 11a having a size 16×16. MV candidates may be generated that correspond to the PU 11a. For example, MV candidates corresponding to PU 11a include spatial candidates top-left MV candidate 11b, a top MV candidate 11c, a left MV candidate 11d, and a temporal MV candidate 11e. In this example, each of the MV candidates have a size of 4×4, including top-left MV candidate 11b, top MV candidates 11c, and a left MV candidate 11d. In other embodiments, MV candidates can have different sizes.

As shown in FIG. 11B, the CU 740 can be partitioned into a left PU 11f and a right PU 11g each having a size 16×8. MV candidates that may be generated that correspond to the PU 11f include spatial candidates top-left MV candidate 11h, a top MV candidate 11i, a top-right MV candidate 11j, a left MV candidate 11l, and a temporal MV candidate 11m. MV candidates that may be generated that correspond to the PU 11g include spatial candidates top-left MV candidate 11i, top MV candidate 11k, and temporal MV candidate 11n. A single MV candidate can serve as an MV candidate for more than one PU. For example, MV candidate 11i is the top MV candidate for PU 11f, whereas MV candidate 11i is also the top-left MV candidate for PU 11g.

As shown in FIG. 11C, the CU 740 can be partitioned into a top PU 11o and a bottom PU 11p each having a size 8×16. MV candidates that may be generated that correspond to the PU 11o include spatial candidates top-left MV candidate 11q, a top MV candidate 11r, a left MV candidate 11s, a bottom-left MV candidate 11u, and temporal MV candidate 11v. MV candidates that may be generated that correspond to the PU 11p include spatial candidates top-left MV candidate 11s, a top MV candidate 11t, a left MV candidate 11w, and temporal MV candidate 11x. As before, a single MV candidate can serve as an MV candidate for more than one PU. For example, MV candidate 11s is the left MV candidate for PU 11o, whereas MV candidate 11s is also the top-left MV candidate for PU 11p.

Figure 12:
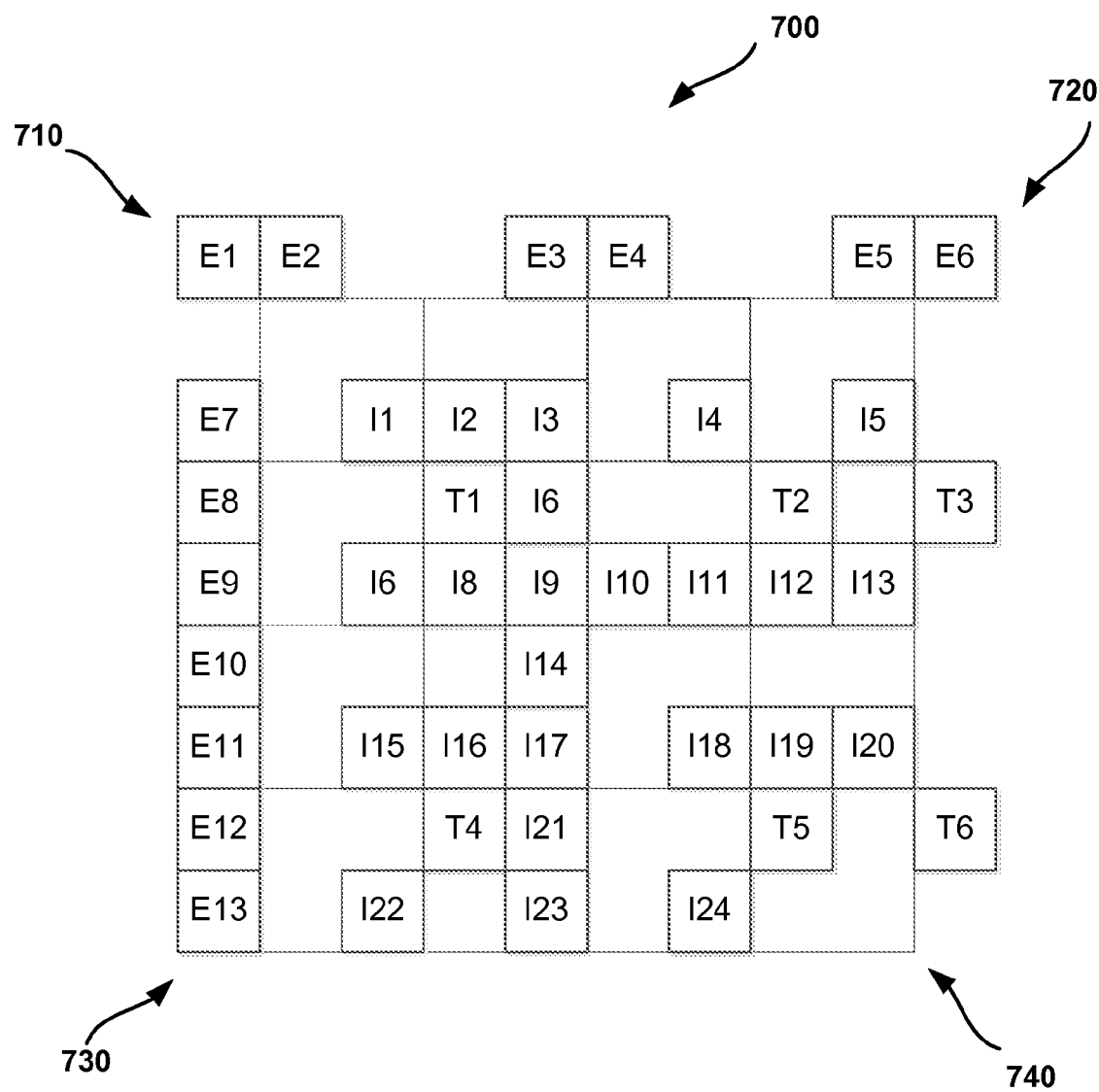
FIG. 12 illustrates an example of a 32×32 CU that shows each MV candidate corresponding to any PU partitioned in the CU.

FIG. 12 illustrates an example of the 32×32 CU 700 that shows each MV candidate corresponding to any PU partitioned in the CU 700 as well as CUs 710, 720, 730, and 740. For example, FIG. 12 includes MV candidates corresponding to the following PUs: 32×32 PU 7a, 32×16 PU 7g, 32×16 PU 7h, 16×32 PU 7q, 16×32 PU 7r, 16×16 PU 8a, 16×8 PU 8h, 16×8 PU 8i, 8×16 PU 8s, 8×16 PU 8t, 16×16 PU 9a, 16×8 PU 9h, 16×8 PU 9i, 8×16 PU 9r, 8×16 PU 9s, 16×16 PU 10a, 16×8 PU 10g, 16×8 PU 10h, 8×16 PU 10q, 8×16 PU 10r, 16×16 PU 11a, 16×8 PU 11f, 16×8 PU 11g, 8×16 PU 11o, and 8×16 PU 11p. In particular, FIG. 12 illustrates 13 spatial MV candidates E1-E13 that are positioned external to the CU 700, 24 spatial MV candidates I1-I24 that are positioned internal to the CU 700, and 6 temporal MV candidates T1-T6. The 13 external spatial MV candidates E1-E13, 24 internal spatial MV candidates I1-I24, and 6 temporal MV candidates T1-T6 correspond to the MV candidates for the PUs within the CU 700. In many instances the MV candidates correspond to more than one PU. For example, the external spatial MV candidate E1 corresponds to six PUs: to the top-left MV candidate 7b of the 32×32 PU 7a, the top-left MV candidate 7i of the 32×16 PU 7g, the top-left MV candidate 7s of the 16×32 PU 7q, the top-left MV candidate 8b of the 16×16 PU 8a, the top-left MV candidate 8j of the 16×8 PU 8h, and the top-left MV candidate 8u of the 8×16 PU 8s.

Selection of MV Candidates Corresponding to PUs within a MER

Figure 13:
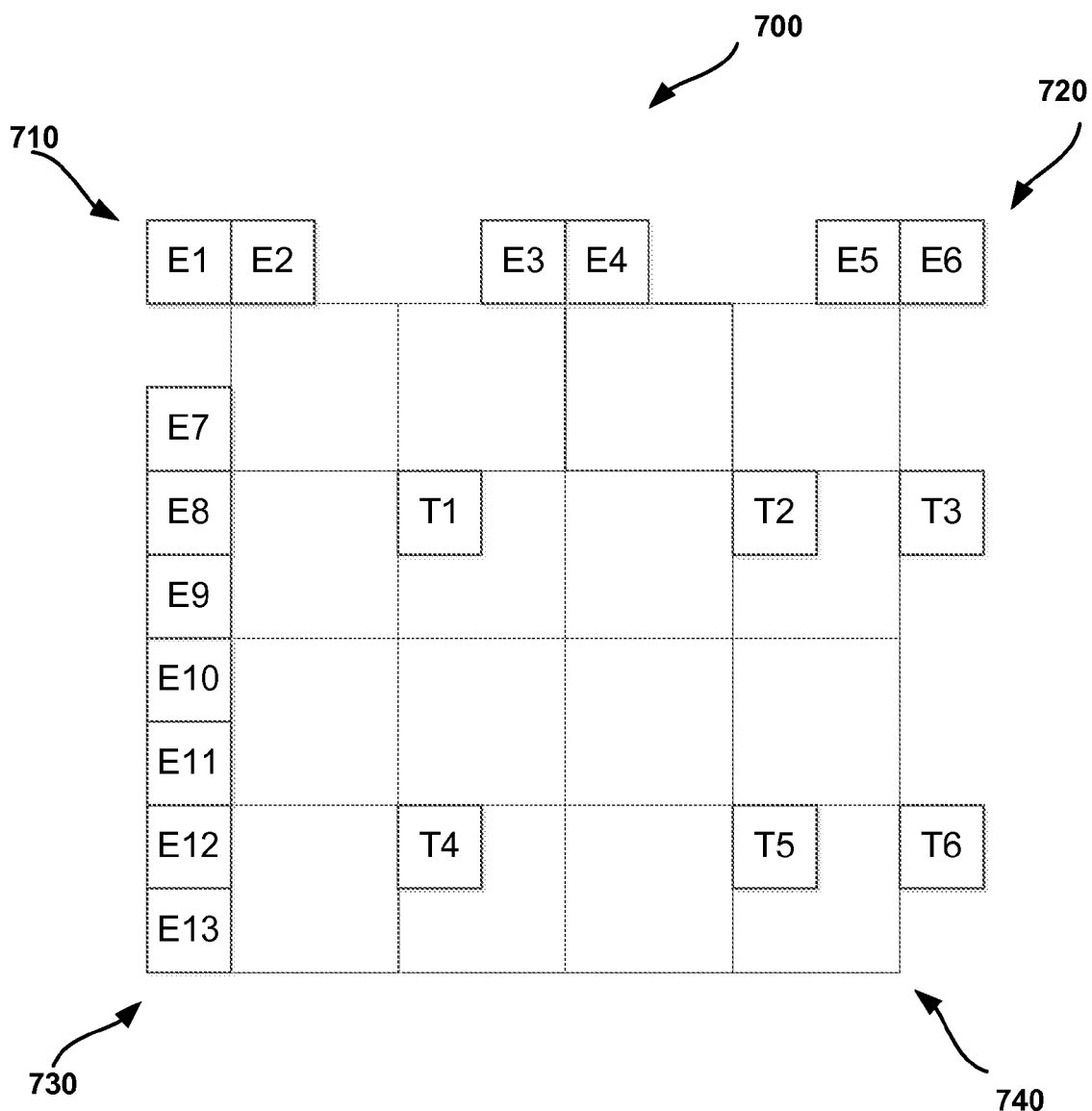
FIG. 13 illustrates an example of a 32×32 motion estimation region (MER) that shows each temporal or external spatial MV candidate corresponding to any PU partitioned in the MER.

FIG. 13 illustrates an example of the 32×32 CU 700 with MER implemented. For example, a 32×32 MER region that corresponds to the same 32×32 CU block 700 can be implemented. In other embodiments, the size of the MER can be the same or different than the LCU size. With MER implemented, only the spatial MV candidates external to the MER as well as co-located temporal MV candidates are considered for inclusion in a merge candidate list. For example, only the 13 spatial MV candidates E1-E13 that are positioned external to the MER, as well as the six temporal MV candidates T1-T6, would be considered for inclusion in a merge candidate list. So, in this embodiment, the total number of merge motion vector candidates considered for inclusion in a merge candidate list is 19.

In some embodiments, a video coding device, such as the video encoder 20 of FIGS. 1 and 2, configured according to some aspects of this disclosure includes a memory configured to store a plurality of motion vector candidates. The plurality of motion vector candidates can comprise an initial list having an initial list size. For example, an initial list comprising the 13 spatial MV candidates E1-E13 that are positioned external to the MER, as well as the 6 temporal MV candidates T1-T6, can have an initial list size of 19. Each of the 19 motion vector candidates corresponds to at least one of a plurality of prediction units (PUs) partitioned in the MER. For example, each of the 19 motion vector candidates corresponds to at least one of the following PUs: 32×32 PU 7a, 32×16 PU 7g, 32×16 PU 7h, 16×32 PU 7q, 16×32 PU 7r, 16×16 PU 8a, 16×8 PU 8h, 16×8 PU 8i, 8×16 PU 8s, 8×16 PU 8t, 16×16 PU 9a, 16×8 PU 9h, 16×8 PU 9i, 8×16 PU 9r, 8×16 PU 9s, 16×16 PU 10a, 16×8 PU 10g, 16×8 PU 10h, 8×16 PU 10q, 8×16 PU 10r, 16×16 PU 11a, 16×8 PU 11f, 168 PU 11g, 8×16 PU 11o, and 8×16 PU 11p. Selection of only the 19 motion vector candidates E1-E13 and T1-T6 can reduce overall computational costs compared to selection of all 43 motion vector candidates illustrated in FIG. 12.

The video coding device can also include a processor in communication with the memory. The processor can be configured to select one or more of the plurality of motion vector candidates E1-E13 to and T1-T6 to include in a merge candidate list having a list size less than the initial list size. The list size and initial list size can be any numbers. For example, the initial list size can be 19, and the list size can be any number between 1 and 10, including 1, 4, 5, 6, 8, and 10.

The selection can be based on a priority level of each motion vector candidate. In an embodiment, the priority level of each of the plurality of motion vector candidates E1-E13 to and T1-T6 can be based on a frequency for which the motion vector candidate corresponds to any of the plurality of PUs partitioned in the MER, with a higher frequency corresponding to a higher priority level. For example, according to an embodiment, external spatial MV candidate E1 can have a frequency of seven based on E1's corresponding to seven PUs: to the top-left MV candidate 7b of the 32×32 PU 7a, the top-left MV candidate 7i of the 32×16 PU 7g, the top-left MV candidate 7s of the 16×32 PU 7q, the top-left MV candidate 8b of the 16×16 PU 8a, the top-left MV candidate 8j of the 16×8 PU 8h, the top-left MV candidate 8u of the 8×16 PU 8s, and the top-left candidate of an 8×8 PU (not shown) partitioned in the top-left quadrant of PU 8a. The processor can be further configured to generate the merge candidate list to include the selected motion vector candidates.

The 19 MV candidates illustrated in FIG. 13 are not necessarily equally important in terms of their contribution in deriving merge mode costs for different CU and PU partitions inside a given MER. For example, some MV candidates can have a higher frequency than others due to candidate location overlap of different CUs or PUs. The frequency of a MV candidate with respect to a given MER is generally static.

In an embodiment, based on the frequency of MV candidates, a priority or weighting factor may be assigned to each candidate. For MV candidates that have a higher frequency, a higher priority or weighting factor may be assigned. Based on the priority or weighting factor, a tradeoff can be obtained between the number of merge candidates supported in a merge candidate list and coding performance. For example, in some embodiments, it is found that when only 10 out of the 19 MV candidates are considered based on their priorities, the performance drop can be less than 0.5% compared to considering all 19 MV merge candidates. Similarly, when only 5 out of the 19 MV candidates are considered based on their priorities, a performance drop of less than 2% compared to considering all 19 MV merge candidates has been found.

Figure 14:
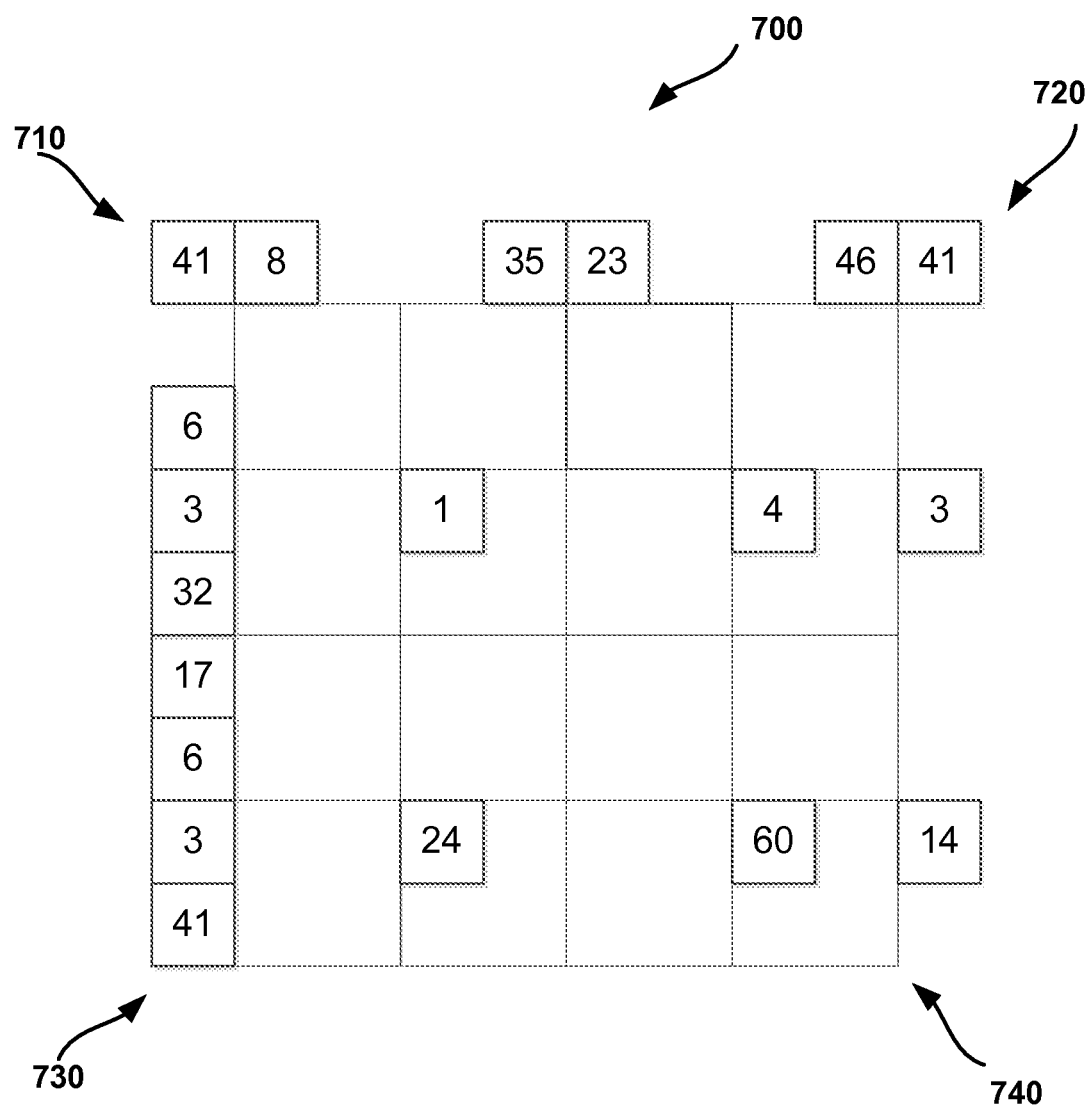
FIG. 14 illustrates an example of a 32×32 MER that shows an example weighted frequency of each temporal or external spatial MV candidate corresponding to any PU partitioned in the MER.

FIG. 14 illustrates an example of a 32×32 MER that shows an example weighted frequency of each temporal or external spatial MV candidate corresponding to any PU partitioned in the MER. As described above, the priority level of each of the plurality of motion vector candidates E1-E13 to and T1-T6 can be based at least in part on a frequency for which the motion vector candidate corresponds to any of the plurality of PUs partitioned in the MER, with a higher frequency corresponding to a higher priority level. In addition, the priority level of each of the plurality of motion vector candidates E1-E13 and T1-T6 can be further based on a weighting factor for each of the plurality of PUs. For example, a weighting factor can depend on a size of each PU to which a motion vector candidate corresponds, with a larger size PU receiving a larger weighting factor. Accordingly, if a MV candidate serves as a merge candidate for a larger PU, it could receive a higher weighting than a candidate that's used only for a smaller PU.

In some embodiments, the weighting factor for each of the plurality of PUs can be directly proportional to the size of each PU. For example, a PU can have a weighting factor of 1 for each 8×8 region within a PU, if one assumes the minimum PU size considered is 8×8. So, a 32×32 PU includes 16 8×8 regions and would have a weighting factor of 16. Likewise, a 16×32 PU can have a weighting factor of 8, a 32×16 PU can have a weighting factor of 8, a 16×16 PU can have a weighting factor of 4, a 8×16 PU can have a weighting factor of 2, a 16×8 PU can have a weighting factor of 2, and an 8×8 PU can have a weighting factor of 1.

The numbered squares in FIG. 14 correspond to the MV candidates E1-E13 and T1-T6. So, for example, the top-left MV candidate having a weighted priority level of 41 corresponds to E1. The weighted priority level of E1 of 41 in this embodiment can be calculated as follows: the top-left MV candidate 7b of the 32×32 PU 7a has a weighting factor of 16, the top-left MV candidate 7i of the 32×16 PU 7g has a weighting factor of 8, the top-left MV candidate 7s of the 16×32 PU 7q has a weighting factor of 8, the top-left MV candidate 8b of the 16×16 PU 8a has a weighting factor of 4, the top-left MV candidate 8j of the 16×8 PU 8h has a weighting factor of 2, the top-left MV candidate 8u of the 8×16 PU 8s has a weighting factor of 2, and the top-left candidate of an 8×8 PU (not shown) partitioned in the top-left quadrant of PU 8a has a weighting factor of 1-16+8+8+4+2+2+1 is 41. The weighted priority of each other MV candidate can be calculated similarly. For example, according to an embodiment, the weighted priority of the MV candidates corresponding to a 32×32 MER are as follows: E1 has a weighted priority of 41; E2 has a weighted priority of 8; E3 has a weighted priority of 35; E4 has a weighted priority of 23; E5 has a weighted priority of 46; E6 has a weighted priority of 41; E7 has a weighted priority of 6; E8 has a weighted priority of 3; E9 has a weighted priority of 32; E10) has a weighted priority of 17; E11 has a weighted priority of 6; E12 has a weighted priority of 3; E13 has a weighted priority of 41; T1 has a weighted priority of 1; T2 has a weighted priority of 4; T3 has a weighted priority of 3; T4 has a weighted priority of 24; T5 has a weighted priority of 60; and T6 has a weighted priority of 14.

Figure 15:
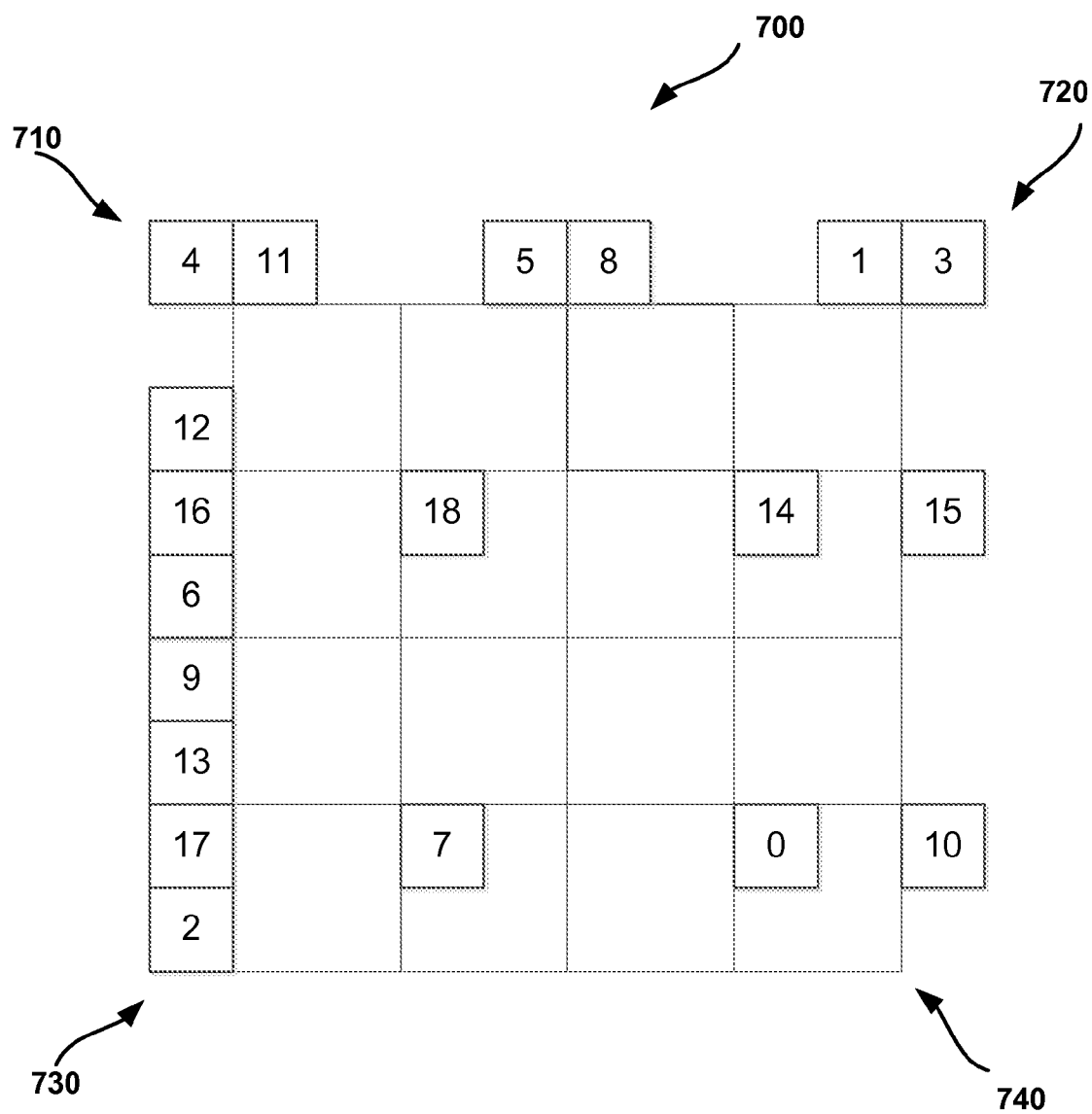
FIG. 15 illustrates an example of a 32×32 MER that shows an example priority level of each temporal or external spatial MV candidate corresponding to any PU partitioned in the MER.

Based on the weighted priority level of each MV candidate, each MV candidate can be ranked in order of priority. FIG. 15 illustrates an example of a 32×32 MER that shows an example priority level ranking of each temporal or external spatial MV candidate corresponding to any PU partitioned in the MER. In particular, FIG. 15 illustrates an index value assigned to each MV candidate in reverse order of weighted priority level. So, because T5 has the highest weighted priority of 60, it has the highest priority, and has an index 0. For example, if a processor is configured to only include a single MV candidate in the merge candidate list (e.g., list size is 1), it would include MV candidate T5. Following T5 in order of weighted priority are E5, E13, E6, E1, E3, E9, T4, E4, E10, T6, E2, E7, E11, T2, T3, E8, E12, and T1. Similarly, if a processor is configured to include five MV candidates in the merge candidate list (e.g., list size is 5), it could include MV candidates T5, E5, E13, E6, and E1.

An advantage of selection of MV candidates based on priority level is that the frequency values, including weighted frequency values, and priority levels derived can be independent from the status of neighboring PUs, such as Intra/Inter block and PU size. So, for example, the priority list doesn't necessarily need to be regenerated for every LCU.

In other embodiments, a priority level of a MV candidate can depend on a position weighting factor. A position weighting factor can depend on a relative position of a spatial MV candidate relative to a corresponding PU. For example, the weighting factor for a MV candidate could depend on whether the candidate is a left candidate for a PU, a right candidate, a top candidate, and so on. Different candidates for a PU may have difference chances of being selected based on the relative location of the candidates to the PU. For example, a spatial MV candidate corresponding to a left-position candidate for a PU can have a higher position weighting factor than a left-above-position MV candidate for a PU.

Figure 16:
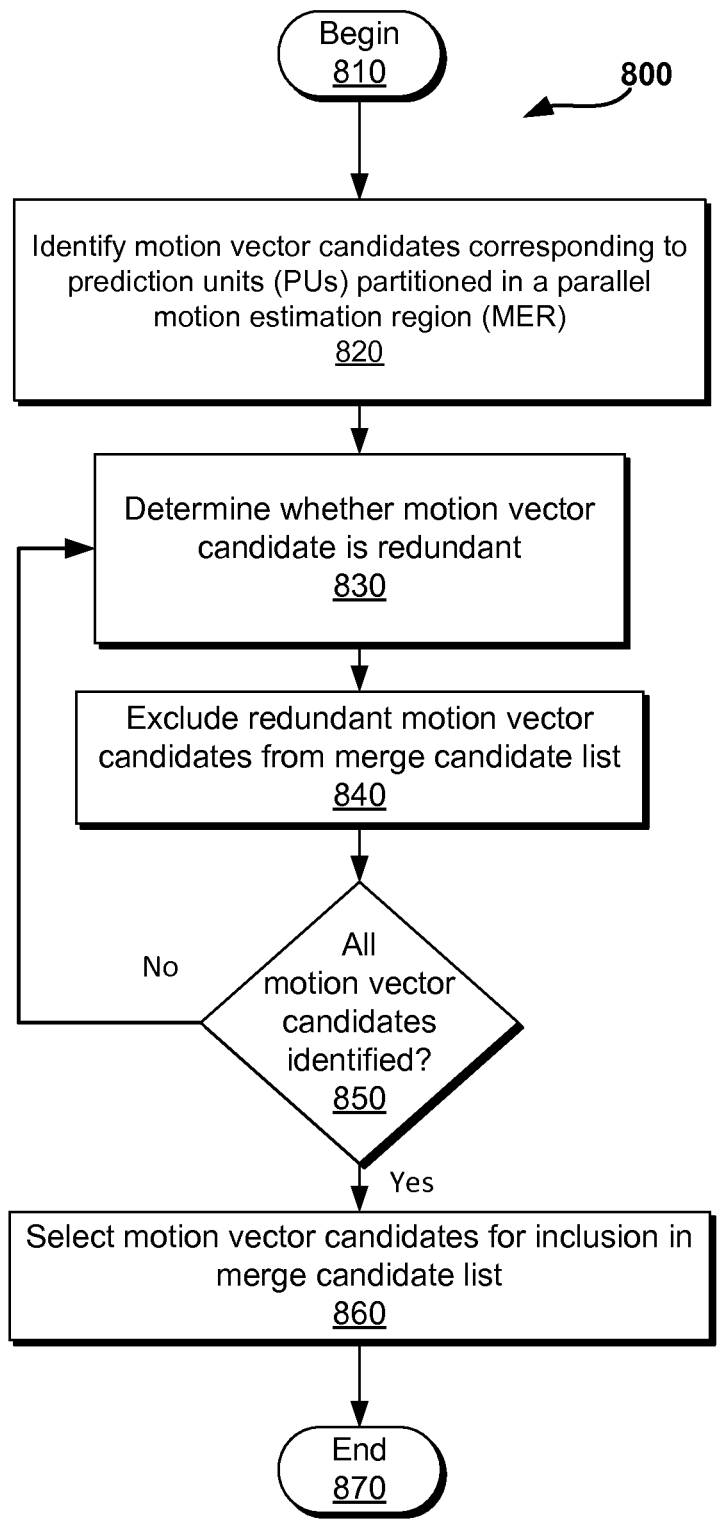
FIG. 16 is a flowchart that illustrates an example process of selecting MV candidates based on a non-redundant status for inclusion in a merge candidate list.

FIG. 16 is a flowchart that illustrates an embodiment of a process 800 of selecting MV candidates based on a non-redundant status for inclusion in a merge candidate list and can be performed by the merge/MVP list generation module 121 or 161 of FIG. 2 or 3 respectively. The process 800 can be applied alone or in addition to or in combination with any other selection process described elsewhere herein, including selection of MV candidates based on priority level, frequency, and weighted frequency. For example, the process 800 starts at block 810. At block 820, MV candidates corresponding to PUs partitioned in a parallel MER are identified. For a 32×32 MER, for example, 19 MV candidates are identified. The process 800 then continues to block 830 and determines whether any particular MV candidate is redundant. For example, when a MV candidate is contained within a candidate PU, the processor can be configured to determine that the MV candidate is redundant based on a status of the candidate PU. In particular, for example, the processor can be configured to determine that the MV candidate is redundant if the candidate PU is coded in intra mode. In addition, the processor can be configured to determine that the MV candidate is redundant if it comprises motion information that is the same as motion information of another of the one or more MV candidates. Also, the processor can be configured to determine that the MV candidate is redundant if the MV candidate has zero motion vector. The process 800 then continues to block 840 and excludes MV candidates from the motion vector list that have been found to be redundant. At block 850 the process 800 checks whether all MV candidates have been identified. If not, the process 800 loops back to block 830. If yes, the process 800 continues to block 860 and selects one or more MV candidates that have not been excluded for inclusion in a merge candidate list. The process 800 ends at block 870.

Figure 17:
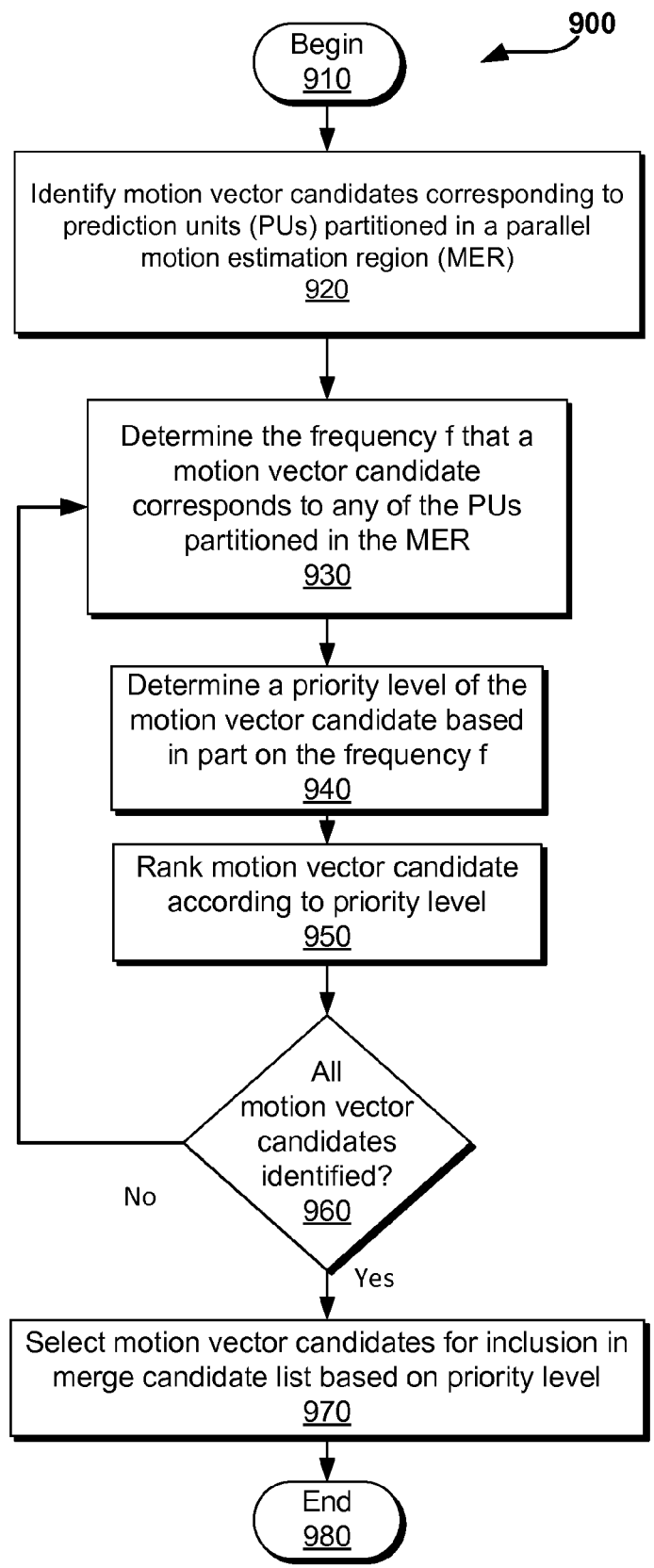
FIG. 17 is a flowchart that illustrates an example process of selecting MV candidates based on priority level for inclusion in a merge candidate list.

FIG. 17 is a flowchart that illustrates an embodiment of a process 900 of selecting MV candidates based on priority level for inclusion in a merge candidate list and can be performed by the merge/MVP list generation module 121 or 161 of FIG. 2 or 3 respectively. The process 900 can be applied alone or in addition to or in combination with any other selection process described elsewhere herein. For example, the process 900 starts at block 910. At block 920, MV candidates corresponding to PUs partitioned in a parallel MER are identified. For a 32×32 MER, for example, 19 MV candidates are identified. The process 900 then continues to block 930 and determines the frequency f for which a MV candidate corresponds to any of the PUs partitioned in the MER. The process 900 proceeds to block 940 and determines a priority level of the MV candidate based in part on the frequency f. For example, in an embodiment in which the priority level of a MV candidate is based only on the frequency f, external spatial MV candidate E1 can have a frequency f of seven based on E1's corresponding to seven PUs: to the top-left MV candidate 7b of the 32×32 PU 7a, the top-left MV candidate 7i of the 32×16 PU 7g, the top-left MV candidate 7s of the 16×32 PU 7q, the top-left MV candidate 8b of the 16×16 PU 8a, the top-left MV candidate 8j of the 16×8 PU 8h, the top-left MV candidate 8u of the 8×16 PU 8s, and the top-left candidate of an 8×8 PU (not shown) partitioned in the top-left quadrant of PU 8a. Alternatively, in an embodiment in which the priority level of a MV candidate further depends on a weighting factor, the MV candidate E1 can have a priority level of 41 calculated as follows: the top-left MV candidate 7b of the 32×32 PU 7a has a weighting factor of 16, the top-left MV candidate 7i of the 32×16 PU 7g has a weighting factor of 8, the top-left MV candidate 7s of the 16×32 PU 7q has a weighting factor of 8, the top-left MV candidate 8b of the 16×16 PU 8a has a weighting factor of 4, the top-left MV candidate 8j of the 16×8 PU 8h has a weighting factor of 2, the top-left MV candidate 8u of the 8×16 PU 8s has a weighting factor of 2, and the top-left candidate of an 8×8 PU (not shown) partitioned in the top-left quadrant of PU 8a has a weighting factor of 1—16+8+8+4+2+2+1 is 41. Any other weighting factor can also be applied in block 940. The process 900 proceeds to block 960 and determines whether all MV candidates have been identified. If not, the process 900 loops back to block 930. If yes, the process 900 continues to block 970 and selects MV candidates for inclusion in a merge candidate list based on the priority level of the MV candidate. The process 900 ends at block 980.

All the techniques described above may also be applied to selecting MV candidates for inclusion in a merge candidate list. In addition, some techniques and examples of this disclosure are described with respect to an example of a 32×32 CU. It should be understood that all the techniques described herein can be applied to examples with CU blocks that contain more or fewer pixels, in varying numbers of rows and columns.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
   a memory configured to store a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data; and
   a processor in communication with said memory, the processor configured to:
      select a subset of the plurality of motion vector candidates to include in a merge candidate list, wherein selection is based on a priority level of each of the plurality of motion vector candidates, wherein the priority level of each of the plurality of motion vector candidates is based on (i) a frequency for which the motion vector candidate corresponds to any of the plurality of PUs partitioned in the MER such that a motion vector candidate that corresponds to a higher number of PUs is associated with a higher priority level and (ii) a weighting factor based on a size of each PU such that a motion vector candidate that corresponds to a larger PU is associated with a higher priority level; and
      generate the merge candidate list to include the selected subset of the plurality of motion vector candidates.

2. The apparatus of claim 1, wherein the weighting factor of each of the plurality of PUs is directly proportional to the size of each PU.

3. The apparatus of claim 1, wherein:
   each of the plurality of motion vector candidates comprises one of a spatial motion vector candidate and a temporal motion vector candidate, and
   a position of each spatial motion vector candidate is located outside of the MER.

4. The apparatus of claim 3, wherein the priority level of each spatial motion vector candidate is further based on a position weighting factor that is dependent on a relative position of the spatial motion vector candidate relative to a corresponding PU.

5. The apparatus of claim 4, wherein a spatial motion vector candidate corresponding to a left-position candidate for a PU has a higher position weighting factor than a left-above-position candidate for a PU.

6. The apparatus of claim 1, wherein the processor is further configured to:
   determine, for each of the plurality of motion vector candidates, whether the motion vector candidate is redundant to another of the plurality of motion vector candidates; and
   exclude redundant motion vector candidates from the merge candidate list.

7. The apparatus of claim 6, wherein the processor is further configured to determine whether the motion vector candidate is redundant based on motion redundancy checking.

8. The apparatus of claim 6, wherein:
the motion vector candidate is contained within a candidate PU; and
the processor is further configured to determine that the motion vector candidate is redundant based on a status of the candidate PU.

9. The apparatus of claim 6, wherein the processor is further configured to determine that the motion vector candidate is redundant if it has motion information that is the same as motion information of another of the selected subset of the plurality of motion vector candidates.

10. The apparatus of claim 1, wherein the apparatus comprises an encoder.

11. The apparatus of claim 1, wherein the apparatus comprises a decoder.

12. The apparatus of claim 1, the apparatus further comprising at least one of a digital television, digital direct broadcast system, wireless broadcast system, personal digital assistant (PDA), laptop or desktop computer, digital camera, digital recording device, digital media player, video gaming device, video game console, cellular or satellite radio telephone, and video teleconferencing device that comprises the memory and the processor.

13. A method of encoding video data, the method comprising:
determining information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data;
selecting a subset of the plurality of motion vector candidates to include in a merge candidate list, wherein selection is based on a priority level of each of the plurality of motion vector candidates, wherein the priority level of each of the plurality of motion vector candidates is based on (i) a frequency for which the motion vector candidate corresponds to any of the plurality of PUs partitioned in the MER such that a motion vector candidate that corresponds to a higher number of PUs is associated with a higher priority level and (ii) a weighting factor based on a size of each PU such that a motion vector candidate that corresponds to a larger PU is associated with a higher priority level; and
generating the merge candidate list to include the selected subset of the plurality of motion vector candidates.

14. The method of claim 13, wherein the weighting factor of each of the plurality of PUs is directly proportional to the size of each PU.

15. The method of claim 13, wherein:
each of the plurality of motion vector candidates comprises one of a spatial motion vector candidate and a temporal motion vector candidate, and
a position of each spatial motion vector candidate is located outside of the MER.

16. The method of claim 15, wherein the priority level of each spatial motion vector candidate is further based on a position weighting factor that is dependent on a relative position of the spatial motion vector candidate relative to a corresponding PU.

17. The method of claim 16, wherein a spatial motion vector candidate corresponding to a left-position candidate for a PU has a higher position weighting factor than a left-above-position candidate for a PU.

18. The method of claim 13, further comprising:
determining, for each of the plurality of motion vector candidates, whether the motion vector candidate is redundant to another of the plurality of motion vector candidates; and
excluding redundant motion vector candidates from the merge candidate list.

19. The method of claim 18, wherein determining whether the motion vector candidate is redundant is based on motion redundancy checking.

20. The method of claim 18, wherein:
the motion vector candidate is contained within a candidate PU; and
determining whether the motion vector candidate is redundant is based on a status of the candidate PU.

21. The method of claim 20, wherein the motion vector candidate is determined to be redundant if the candidate PU is coded in intra mode.

22. The method of claim 18, wherein the motion vector candidate is determined to be redundant if it has motion information that is the same as motion information of another of the selected subset of the plurality of motion vector candidates.

23. A video coding apparatus, the apparatus comprising:
means for determining information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data;
means for selecting a subset of the plurality of motion vector candidates to include in a merge candidate list, wherein selection is based on a priority level of each of the plurality of motion vector candidates, wherein the priority level of each of the plurality of motion vector candidates is based on (i) a frequency for which the motion vector candidate corresponds to any of the plurality of PUs partitioned in the MER such that a motion vector candidate that corresponds to a higher number of PUs is associated with a higher priority level and (ii) a weighting factor based on a size of each PU such that a motion vector candidate that corresponds to a larger PU is associated with a higher priority level; and
means for generating the merge candidate list to include the selected subset of the plurality of motion vector candidates.

24. A non-transitory computer readable medium having stored thereon code that when executed causes an apparatus to:
receive information associated with a plurality of motion vector candidates, each of the plurality of motion vector candidates corresponding to at least one of a plurality of prediction units (PUs) partitioned in a parallel motion estimation region (MER), each of the plurality of motion vector candidates comprising available motion data;
select a subset of the plurality of motion vector candidates to include in a merge candidate list, wherein selection is based on a priority level of each of the plurality of motion vector candidates, wherein the priority level of each of the plurality of motion vector candidates is based on (i) a frequency for which the motion vector candidate corresponds to any of the plurality of PUs partitioned in the MER such that a motion vector candidate that corresponds to a higher number of PUs is associated with a higher priority level and (ii) a weighting factor based on a size of each PU such that a motion vector candidate that corresponds to a larger PU is associated with a higher priority level; and
generate the merge candidate list to include the selected subset of the plurality of motion vector candidates.

* * * * *